(12) United States Patent
Matsuzaki et al.

(10) Patent No.: US 7,989,113 B2
(45) Date of Patent: Aug. 2, 2011

(54) SOLID-OXIDE SHAPED FUEL CELL MODULE

(75) Inventors: Yoshio Matsuzaki, Tokyo (JP); Teruhiro Sakurai, Tokyo (JP); Kenjiro Fujita, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 1611 days.

(21) Appl. No.: 10/548,619

(22) PCT Filed: Mar. 12, 2004

(86) PCT No.: PCT/JP2004/003275
§ 371 (c)(1),
(2), (4) Date: Sep. 8, 2005

(87) PCT Pub. No.: WO2004/082058
PCT Pub. Date: Sep. 23, 2004

(65) Prior Publication Data
US 2006/0147778 A1  Jul. 6, 2006

(30) Foreign Application Priority Data
Mar. 13, 2003  (JP) .................... 2003-068950

(51) Int. Cl.
*H01M 8/12* (2006.01)
*H01M 8/24* (2006.01)
(52) U.S. Cl. .............. 429/465; 429/466; 429/517
(58) Field of Classification Search ............. None
See application file for complete search history.

(56) References Cited

U.S. PATENT DOCUMENTS

| | | | | |
|---|---|---|---|---|
| 5,993,989 A | * | 11/1999 | Baozhen et al. | 429/41 |
| 2001/0038936 A1 | * | 11/2001 | Nishi et al. | 429/32 |
| 2002/0098401 A1 | * | 7/2002 | Barnett | 429/30 |

FOREIGN PATENT DOCUMENTS

| | | |
|---|---|---|
| DE | 19962782 A1 * | 7/2000 |
| JP | 2-36165 | 3/1990 |
| JP | 05-166519 | 7/1993 |
| JP | 05-290874 | 11/1993 |
| JP | 09-312163 | 12/1997 |
| JP | 11-149934 | 6/1999 |
| JP | 2000-106192 | 4/2000 |
| JP | 2003-051319 | 2/2003 |
| JP | 2003-123827 | 4/2003 |

OTHER PUBLICATIONS

Machine translation of JP 11-149934, Jun. 1999.*

(Continued)

*Primary Examiner* — Jonathan Crepeau
(74) *Attorney, Agent, or Firm* — Flynn, Thiel, Boutell & Tanis, P.C.

(57) ABSTRACT

There is provided a solid oxide fuel cell module comprising a substrate with an internal fuel flow part provided therein, at least a face thereof, in contact with cells, and interconnectors, being an insulator, a plurality of the cells each made of an anode, an electrolyte, and a cathode, stacked in sequence, formed on a surface of the substrate, and the interconnectors each electrically connecting in series the cells adjacent to each other, wherein the respective cells are varied in area along the direction of fuel flow, and solid oxide fuel cell bundled modules using the same. With the solid oxide fuel cell module of a multi-segment type, according to the invention, it is possible to aim at higher voltage and to attain an improvement in power generation efficiency and current collecting efficiency.

15 Claims, 31 Drawing Sheets

OTHER PUBLICATIONS

Machine translation of JP 05-166519, Jul. 1993.*
Machine translation of JP 5-290874, Nov. 1993.*

Fifth European Solid Oxide Fuel Cell Forum, Proceedings, vol. 2, Jul. 2002, pp. 1075-1083.

* cited by examiner

SOFC COUPLED MODULES

SOFC COUPLED MODULES

SOFC COUPLED MODULES

EXTERNAL THREADS

EXTERNAL THREADS

34: OPENING (FUEL FLOW PATH)

FUEL 31

SOFC COUPLED MODULES

EXTERNAL THREADS

SOFC COUPLED MODULES

SOFC COUPLED MODULES

SPENT FUEL
FUEL

WITHOUT FUEL FLOW PATH

STRUCTURE FOR DRAWING OUT ALL ELECTRIC CURRENT
FROM THE FUEL FLOW PATH SIDE OF A SUBSTRATE

FIG. 30
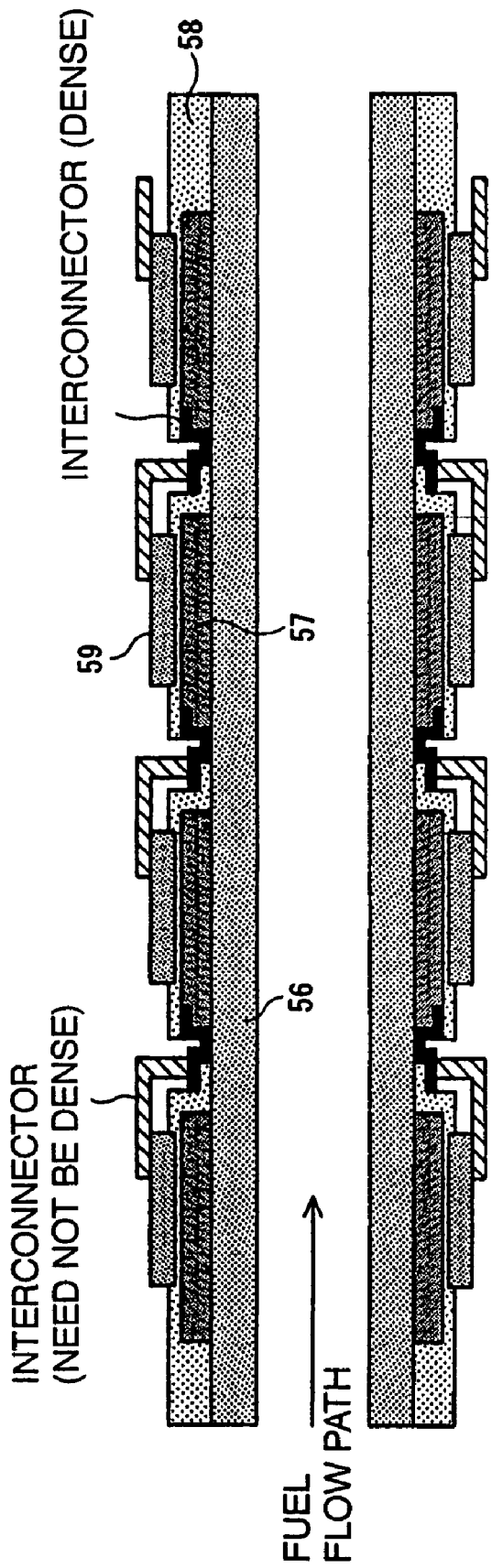
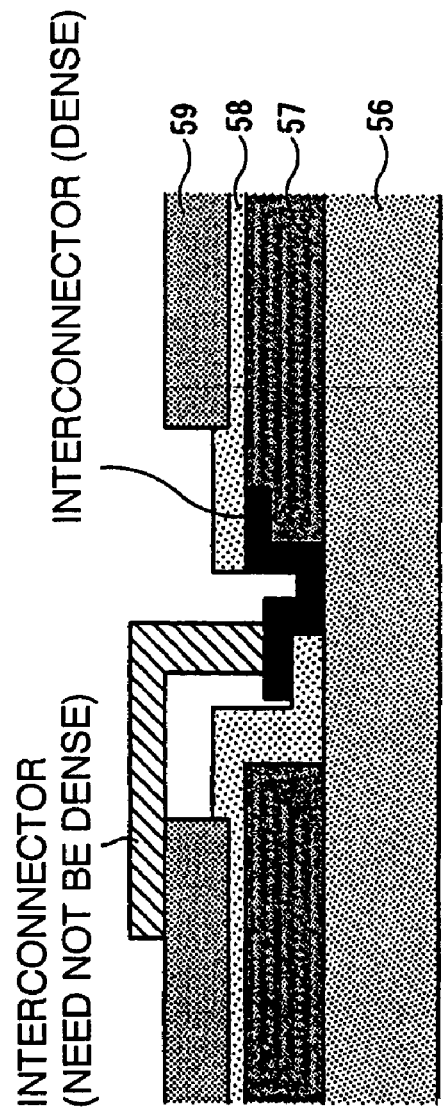

SOLID-OXIDE SHAPED FUEL CELL MODULE

TECHNICAL FIELD

The invention relates to a solid oxide fuel cell module, and more specifically, to a solid oxide fuel cell module comprising a multitude of cells disposed on a surface of a substrate with an internal fuel flow part provided therein, at least a face of the surface, in contact with the cells, and interconnectors, being an insulator, and solid oxide fuel cell bundled modules (that is, a set of solid oxide fuel cell modules, comprised of a plurality of units of the solid oxide fuel cell modules that are coupled up).

BACKGROUND TECHNOLOGY

A solid oxide fuel cell (referred to hereinafter merely as an SOFC where appropriate) is a fuel cell using an oxide as a solid electrolytic material having ionic conductivity. The fuel cell generally has an operating temperature as high as on the order of 1000° C., but there is lately being developed one having an operating temperature not higher than about 800° C., for example, on the order of 750° C. With the SOFC, there are disposed an anode (that is, a fuel electrode), and a cathode (that is, an air electrode or an oxygen electrode) with an electrolytic material sandwiched therebetween, thereby making up a single cell as a three-layer unit of the anode/an electrolyte/the cathode.

When the SOFC is operated, fuel is fed to the anode side of the single cell (also referred to merely as "a cell" where appropriate in the present description), air as an oxidizing agent is fed to the cathode side thereof, and electric power is obtained by connecting both the electrodes to an external load. However, with the single cell of one unit only, a voltage only on the order of 0.7V at most can be obtained, so that there is the need for connecting in series a plurality of the single cells together in order to obtain electric power for practical use. For the purpose of electrically connecting adjacent cells with each other while concurrently feeding fuel, and air to the anode, and the cathode, respectively, after properly distributing them, and subsequently, effecting emission thereof, separators (=interconnectors) and the single cells are alternately stacked.

Such an SOFC system as described above is a type wherein a plurality of the single cells are stacked one on top of another, but it is conceivable to adopt a multi-segment type in place of such a type as described, for example, in Fifth European Solid Oxide Fuel Cell forum (1-5, Jul. 2002) p. 1075-, the external appearance of the multi-segment type and so forth are disclosed although the contents thereof are not necessarily clearcut in detail. As the multi-segment type, two types including a cylindrical type and a hollow flat type are conceivable.

FIG. 1 is a view showing an example of the structure of the hollow flat type of the two types, FIG. 1(a) being a perspective squint view, FIG. 1(b) a plan view, and FIG. 1(c) a sectional view taken on line A-A in FIG. 1(b). As shown in FIGS. 1(a)-(c), there are formed a plurality of cells 2 each made up by stacking an anode 3, an electrolyte 4, and a cathode 5 in that order on an insulator substrate 1 in a hollow flat sectional shape, and the respective cells 2 are structured so as to be electrically connected in series with each other through the intermediary of an interconnector 6, respectively. Fuel is caused to flow in space within the insulator substrate 1, that is, an internal fuel flow part 7, in parallel with a lineup of the cells 2, as indicated by an arrow (→) in FIGS. 1(a) and 1(c).

Now, with the SOFC system of the hollow flat type as described above, the fuel is going to become thinner as it moves in the direction of its flow. Nevertheless, since the respective cells are disposed so as to be electrically connected in series, the same current is forced to flow between the cells even under thinned fuel. Consequently, voltage drop increases, thereby causing a problem of lower power generation efficiency. In addition, since the respective cells are connected in series in one direction, a voltage obtained is limited.

DISCLOSURE OF THE INVENTION

Under the circumstances, it is an object of the invention to aim at higher voltage by solving the various problems occurring to an SOFC system of a multi-segment type, and to provide a solid oxide fuel cell module, and solid oxide fuel cell bundled modules, attaining improvement in power generation efficiency, and current collecting efficiency, The invention provides (1) a solid oxide fuel cell module comprising:

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow.

The invention provides (2) a solid oxide fuel cell module comprising:

a substrate with an internal fuel flow part provided therein, at least a face thereof, in contact with cells, and interconnectors, being an insulator;

a plurality of the cells each comprised of an anode, an electrolyte, and a cathode, stacked in sequence, formed in each of a plurality of rows from first to n-th rows on a surface of the substrate; and the interconnectors each electrically connecting in series the cells adjacent to each other, wherein the respective cells are varied in area along the direction of fuel flow.

The invention provides (3) solid oxide fuel cell bundled modules comprising:

two units of solid oxide fuel cell modules disposed with an interval provided therebetween, and in such a way as to be plane parallel with each other, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, the respective modules being provided with a female-threaded hole, on one-side faces thereof, opposing each other, on the fuel inlet side thereof, and an interval-retaining hollow member having a skirting part provided with external threads so as to mate with the respective female-threaded holes adjacent thereto being interposed between the female-threaded holes, wherein said two units of the solid oxide fuel cell modules are securely held with each other by rotatively reciprocating the interval retaining hollow member.

The invention provides (4) solid oxide fuel cell bundled modules comprising:

plural units of solid oxide fuel cell modules disposed in such a way as to be plane parallel with each other to be coupled together, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, two modules at both extreme ends, respectively, among said plural units of the solid oxide fuel cell modules, being provided with a female-threaded hole, on one-side faces thereof, on the fuel inlet side thereof, while the respective modules between the two modules at both the extreme ends, respectively, being provided a female-threaded hole, on both-side faces thereof, on the fuel inlet side thereof, and an interval-retaining hollow member having a skirting part provided with external threads so as to mate with the respective female-threaded holes adjacent thereto being interposed between the female-threaded holes adjacent to each other, wherein the respective solid oxide fuel cell modules are securely held with each other by rotatively reciprocating the respective interval retaining hollow members.

The invention provides (5) solid oxide fuel cell bundled modules comprising:

two units of solid oxide fuel cell modules disposed with an interval provided therebetween, and in such a way as to be plane parallel with each other, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, the respective modules being provided with an opening, on one-side faces thereof, opposite to each other, on the fuel inlet side thereof, and also a hole corresponding to the diameter of the shank of a screw bolt on the other side faces thereof, opposite from the openings of the respective modules, while an interval-retaining hollow member having a skirting part corresponding to the respective openings being interposed between the openings, wherein said two units of the solid oxide fuel cell modules are securely held with each other by inserting the screw bolt with a head at one end thereof, or the screw bolt with threads at both ends thereof into the holes, openings, and a hollow part of the interval-retaining hollow member, from one end of the screw bolt, and tightening up with a nut, or nuts.

The invention provides (6) solid oxide fuel cell bundled modules comprising:

plural units of solid oxide fuel cell modules disposed with an interval provided therebetween, and in such a way as to be plane parallel with each other, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, two modules at both the extreme ends, respectively, among said plural units of the solid oxide fuel cell modules, being provided with an opening, on one-side faces thereof, on the fuel inlet side thereof, and also a hole corresponding to the diameter of the shank of a screw bolt on the other side faces thereof, opposite from the respective openings of the two modules at both the extreme ends, respectively, while the respective modules between the two modules at both the extreme ends, respectively, being provided an opening, on both-side faces thereof, on the fuel inlet side thereof, and an interval-retaining hollow member having a skirting part provided with external threads so as to mate with the respective openings adjacent thereto being interposed between the adjacent openings, wherein the respective solid oxide fuel cell modules are securely held with each other by inserting the screw bolt with a head at one end thereof, or the screw bolt with threads at both ends thereof into the holes, openings, and a hollow part of the interval retaining hollow member, from one end of the screw bolt, and tightening up with a nut, or nuts.

The invention provides (7) solid oxide fuel cell bundled modules comprising:

plural units of solid oxide fuel cell modules disposed with an interval provided therebetween, and in such a way as to be plane parallel with each other, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, two modules at both the extreme ends, respectively, among said plural units of the solid oxide fuel cell modules, being provided with an opening, on one-side faces thereof, on the fuel inlet side thereof while the respective modules between the two modules at both the extreme ends, respectively, being provided an opening, on both-side faces thereof, on the fuel inlet side thereof, and an interval-retaining hollow member having a skirting part matching the respective openings adjacent thereto being interposed between the adjacent openings, wherein the solid oxide fuel cell modules in whole are disposed inside a casing to be securely held with each other.

The invention provides (8) solid oxide fuel cell bundled modules comprising:

plural units of solid oxide fuel cell modules disposed with an interval provided therebetween, and in such a way as to be plane parallel with each other, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, the module of said plural units of the solid oxide fuel cell modules, at the forefront in the direction of the fuel flow, being provided with an opening on the fuel feeding side thereof while the respective modules subsequent to the module at the forefront being provided openings on the spent fuel emission and fuel feeding sides thereof, respectively, and an interval-retaining hollow member having a skirting part being interposed between the openings of the respective modules adjacent to each other, opposite to each other, wherein the solid oxide fuel cell modules in whole are disposed inside a casing to be securely held with each other.

The invention provides (9) solid oxide fuel cell bundled modules comprising:

plural units of solid oxide fuel cell modules disposed with an interval provided therebetween, and in such a way as to be plane parallel with each other, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, the module of said plural units of the solid oxide fuel cell modules, at the forefront in the direction of the fuel flow, being provided with an opening on the fuel feeding side thereof while the respective modules subsequent to the module at the forefront being provided openings on the spent fuel emission and fuel feeding sides thereof, respectively, and an interval-retaining hollow member having a skirting part, and an interval-retaining unhollow member having a skirting part being interposed between the openings of the respective modules adjacent to each other, opposite to each other, in the upper part and lower part of the respective modules, in a staggered fashion, wherein the solid oxide fuel cell modules in whole are disposed inside a casing to be securely held with each other.

The invention provides (10) solid oxide fuel cell bundled modules comprising:

plural units of solid oxide fuel cell modules disposed with an interval provided therebetween, and in such a way as to be plane parallel with each other, said solid oxide fuel cell module comprising;

a substrate with an internal fuel flow part provided therein, at least a face thereof, in contact with cells, and interconnectors, being an insulator;

a plurality of the cells each comprised of an anode, an electrolyte, and a cathode, stacked in sequence, formed on a surface of the substrate; and the interconnectors each electrically connecting in series the cells adjacent to each other, wherein the respective cells are varied in area along the direction of fuel flow, two modules at both the extreme ends, respectively, among said plural units of the solid oxide fuel cell modules, being provided with an opening, on one-side faces thereof, on the fuel inlet side thereof, while the respective modules between the two modules at both the extreme ends, respectively, being provided an opening, on both-side faces thereof, on the fuel inlet side thereof, and an interval-retaining hollow member having a skirting part matching the respective openings adjacent thereto being interposed between the adjacent openings, wherein the solid oxide fuel cell modules in whole are disposed inside a casing to be securely held with each other, and are structured such that pressure loss occurs at parts of the respective modules, where fuel inside the respective modules is released to the outside.

BRIEF DESCRIPTION OF THE DRAWINGS

FIG. 30 is a view showing an interconnector configuration construction 10 according to the invention.

BEST MODE FOR CARRYING OUT THE INVENTION

Figure 1:
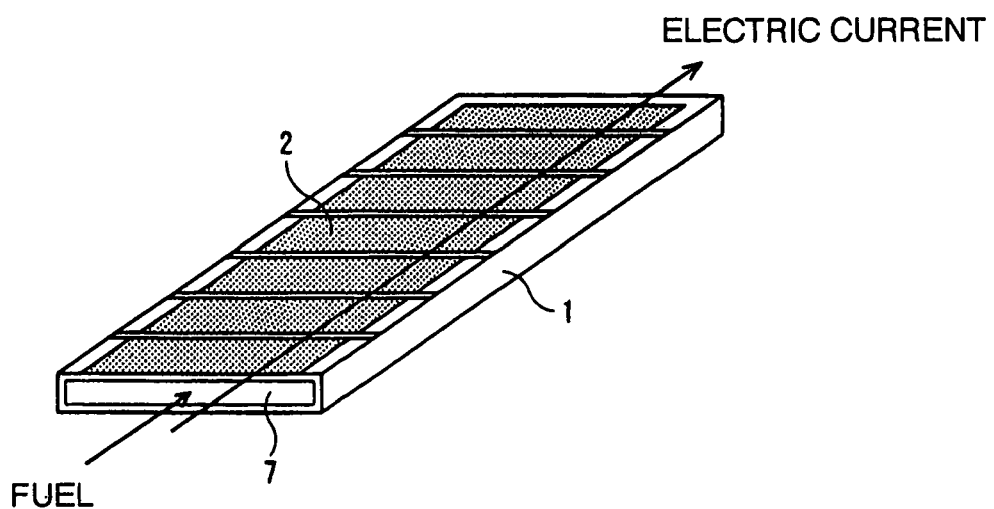
FIGS. 1(a) to 1(c) are views showing an example of the structure of a hollow flat type solid oxide fuel cell module.
Figure 1:
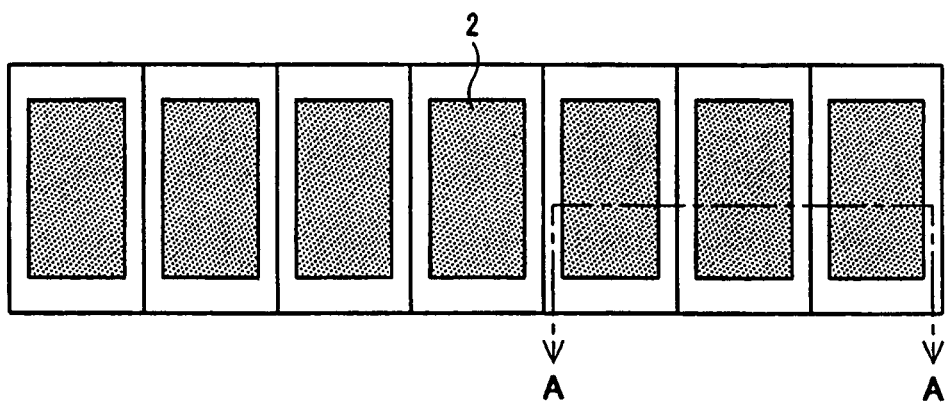
Figure 1:
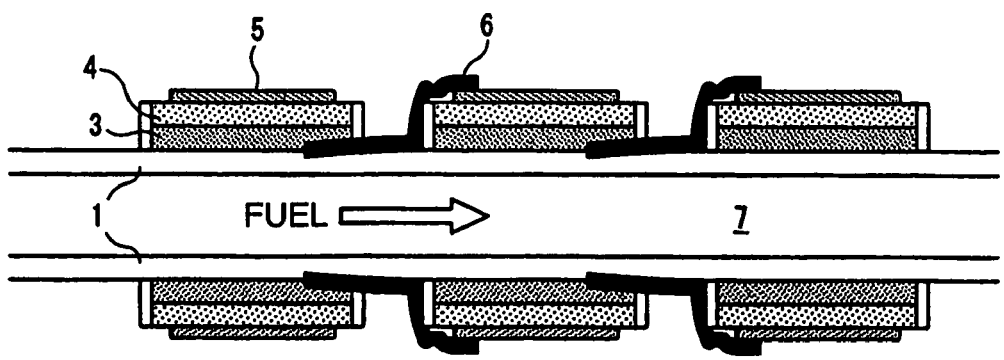

The present invention is concerned with an SOFC module comprising a plurality of cells each made up of an anode, an electrolyte, and a cathode sequentially formed on a surface of a substrate with an internal fuel flow part provided therein, at least a face of the substrate, in contact with the cells, and interconnectors, being an insulator, and the cells adjacent to each other being electrically connected in series through the intermediary of the respective interconnectors, and is also concerned with a set of the SOFC modules, made up by coupling up a plurality of the SOFC modules, that is, SOFC bundled modules. Further, the invention has a basic feature in that the respective cells are varied in area along the direction of fuel flow.

With the SOFC module of a multi-segment type, according to the invention, it is possible to aim at higher voltage, and to attain improvement in power generation efficiency, and current collecting efficiency.

The substrate with the internal fuel flow part provided therein, at least the face thereof, in contact with the cells, and the interconnectors, being the insulator, may be of any structure provided that fuel can be distributed therein, a plurality of the cells can be disposed on an outer surface thereof, and at least a face thereof, in contact with the cells and the interconnectors, is an insulator, and the structure thereof may be, for example, rectangular (hollow-flat), polygonal, such as triangular, quadrilateral (hollow-quadrilateral), pentagonal, and so forth, circular, elliptical, and of other suitable shapes, in a cross-sectional shape. Besides the case where one unit of the internal fuel flow part is provided inside the insulator substrate, a plurality of units of the internal fuel flow parts can be provided therein.

As the constituent material of a solid electrolyte, use may be of any solid electrolytic material having ionic conductivity, and as examples of the constituent material, there can be included materials described under items (1) to (4) given hereunder:
(1) yttria-stabilized zirconia [YSZ: $(Y_2O_3)_x(ZrO_2)_{1-x}$] (in chemical formula, x=0.05 to 0.15);
(2) scandia-stabilized zirconia [$(Sc_2O_3)_x(ZrO_2)_{1-x}$] (in chemical formula, x=0.05 to 0.15);
(3) yttria-doped ceria [$(Y_2O_3)_x(CeO_2)_{1-x}$] (in chemical formula, x=0.02 to 0.4);
(4) gadolinia-doped ceria [$(Gd_2O_3)_x(CeO_2)_{1-x}$] (in chemical formula, x=0.02 to 0.4)

As the constituent material of the anode, use is made of, for example, material composed mainly of Ni, material composed of a mixture of Ni and YSZ [$(Y_2O_3)_x(ZrO_2)_{1-x}$] (in chemical formula, x=0.05 to 0.15), and so forth. In the case of the material composed of the mixture of Ni and YSZ, the material with not less than 40 vol. % of Ni diffused in the mixture is preferably used.

As the constituent material of the cathode, use is made of, for example, Sr-doped $LaMnO_3$.

As the constituent material of the substrate with the internal fuel flow part provided therein, at least the face thereof, in contact with the cells, and the interconnectors, being the insulator, use can be made of a mixture of MgO, and $MgAl_2O_4$, a zirconia-based oxide, a mixture of the zirconia-based oxide, MgO, and $MgAl_2O_4$, and so forth. Among those materials, the mixture of MgO and $MgAl_2O_4$ is preferably a mixture of MgO and $MgAl_2O_4$ containing 20 to 70 vol. % of MgO. Further, as an example of the zirconia-based oxide, there can be cited an yttria-stabilized zirconia [YSZ: $(Y_2O_3)_x(ZrO_2)_{1-x}$] (in chemical formula, x=0.03 to 0.12), and so forth. The substrate can have nickel diffused therein in an amount up to 35 vol. %.

With the SOFC module according to the invention, the interconnector connects the anode to the cathode between the respective cells adjacent to each other (that is, between the anodes of the respective cells and the cathodes of the respective cells disposed next to the former). As examples of the constituent material of the interconnector, there can be cited materials described under items (1) to (4) given hereunder:
(1) material composed mainly of an oxide, expressed by chemical formula (Ln, A) $CrO_3$ (in chemical formula, Ln refers to lanthanoids, and A refers to Ba, Ca, Mg, or Sr)
(2) an oxide containing Ti, for example, $MTiO_3$ (in chemical formula, M refers to at least one element selected from the group consisting of Ba, Ca, Pb, Bi, Cu, Sr, La, Li, and Ce)
(3) material composed mainly of Ag. In the case of this material, it is desirable to cover an interconnector made of this material with glass.
(4) material composed of one substance or not less than two substances, selected from the group consisting of Ag, Ag solder, and a mixture of Ag and glass.

Further, the SOFC module according to the invention may comprise an interface layer between the electrolyte and the cathode.

SPECIFIC MODES OF THE INVENTION

Specific modes of the invention are sequentially described hereinafter, however, it goes without saying that the invention is not limited thereto.

Working Example 1 of an SOFC Module Structure

Figure 2:
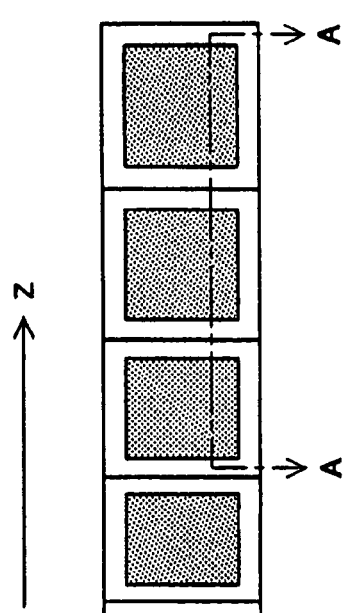
FIGS. 2(a) to 2(c) are views showing Working Example 1 of an SOFC module structure according to the invention.
Figure 2:
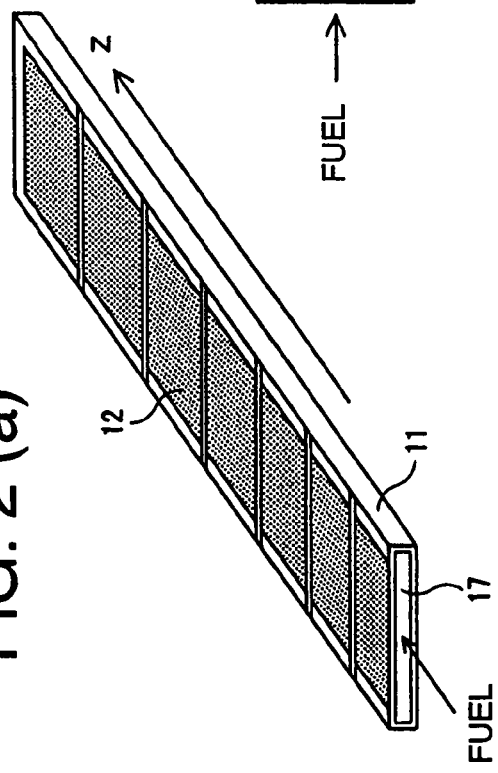
Figure 2:
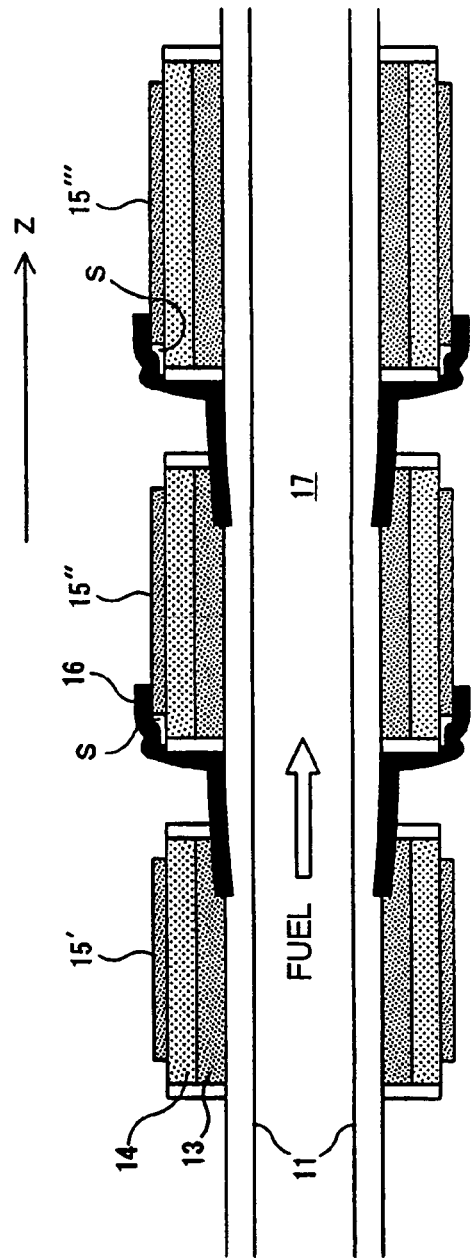

FIGS. 2(a) to 2(c) are views showing Working Example 1 of an SOFC module structure according to the invention. FIG. 2(a) is a perspective squint view, FIG. 2(b) a plan view, and FIG. 2(c) a sectional view taken on line A-A in FIG. 2(b), showing the SOFC module structure as expanded so as to be larger than that in FIG. 2(b). As shown in FIGS. 2(a) to 2(c), on either the upper side face or the underside face, or both the faces of a porous insulator substrate 11 in a hollow-flat sectional shape, with an internal fuel flow part 17 provided therein, at least the face thereof, in contact with cells, and interconnectors, being an insulator, there are formed in series a plurality of the cells 12 each made up of an anode 13, an electrolyte 14, and a cathode 15', 15" or 15'", stacked in sequence, and the cells 12 adjacent to each other are connected with each other through the intermediary of the respective interconnectors 16. In FIG. 2(c), the interconnector 16 is seen covering part of the surface of the cathode 15, however, may cover the entire surface thereof. Further, in FIG. 2(c), blank portions indicated by S may be filled up with the interconnector material. In those respects described, the same applies to Working Examples that will be described hereinafter.

Then, the SOFC module is structured such that the respective cells are varied in area along the direction of fuel flow. In FIGS. 2(a) to 2(c), there is shown one case where the respective cells sequentially increase in area along the direction of the fuel flow, as indicated by an arrow (→Z), and as indicated by 15', 15", 15''' in FIG. 2(c), the cathodes are structured so as to sequentially increase in area as the anode 13, and the electrolyte 14 sequentially increase in area along the direction of the fuel flow.

Besides the above, as examples of modes, wherein the respective cells are structured so as to vary in area along the direction of the fuel flow, the SOFC module may be structured as described under items (1) to (3) given hereunder:

(1) One cell group is made up of a plurality of the cells identical in area. The SOFC module is structured such that there are sequentially disposed the cell groups with the respective cells thereof, sequentially increasing in area along the direction of the fuel flow. For example, there are disposed the respective cell groups in sequential order, such as the cell group a→the cell group b→the cell group c ... along the direction of the fuel flow, in which case, the areas of the respective cells of the cell group b are larger than those of the cell group a, the areas of the respective cells of the cell group c are larger than those of the cell group b, and so on.

(2) One cell group is made up of a plurality of the cells identical in area. The SOFC module is structured such that there are sequentially, and alternately disposed the cell groups, and the cells not belonging to any of the cell groups (that is, individual cells) along the direction of the fuel flow while the areas of the respective cells are sequentially increased. For example, there are disposed the respective cell groups and the individual cells in a manner, such as the cell group a→the cell b→the cell group c→the cell d ... along the direction of the fuel flow, in which case, the area of the cell b is larger than the areas of the respective cells of the cell group a, the areas of the respective cells of the cell group c are larger than the area of the cell b, and so on.

(3) One cell group is made up of a plurality of the cells identical in area. The SOFC module is structured such that there are disposed the cell groups, and the cells not belonging to any of the cell groups (that is, individual cells) sequentially along the direction of the fuel flow, but at random, while the areas of the respective cells are sequentially increased along the direction of the fuel flow. For example, the respective cell groups, and the individual cells are disposed in a manner, such as the cell group a→the cell b→the cell c→the cell group d→the cell e ... along the direction of the fuel flow, in which case, the area of the cell b is larger than the areas of the respective cells of the cell group a, the area of the cell c is rendered larger than that of the cell b, the areas of the respective cells of the cell group d are larger than that of the cell c, and so on.

Electric power is drawn out between the cell at the forefront in the direction of the fuel flow and the cell at the rearmost in the direction of the fuel flow. As fuel is consumed at the respective cells, it becomes gradually thinner along the direction of the fuel flow, however, in the case of Working Example 1 as shown in FIGS. 2(a) to 2(c), the areas of the respective cells are sequentially increased, so that current density sequentially decreases. In this respect, the same applies to the cases of the examples of the modes described under items (1) to (3) as above. Accordingly, power generation efficiency can be enhanced. Further, since there is an increase in the number of the cells of which adjacent ones are electrically connected in series, voltage increases, and conversion efficiency from direct current (DC) to alternating current (AC) can be enhanced.

Figure 3:
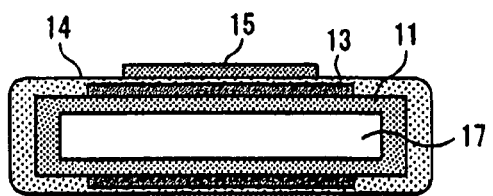
FIGS. 3(a) to 3(g) are views showing examples of the structure of "a substrate with an internal fuel flow part provided therein, at least a face thereof, in contact with cells, and interconnectors, being an insulator"
Figure 3:
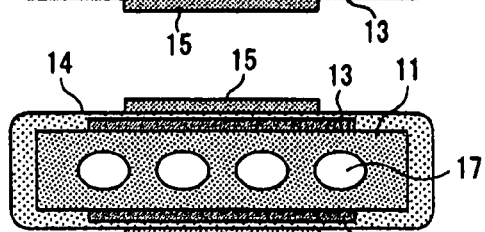
Figure 3:
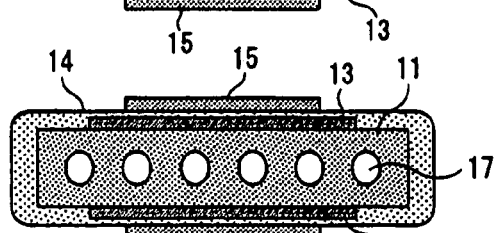
Figure 3:
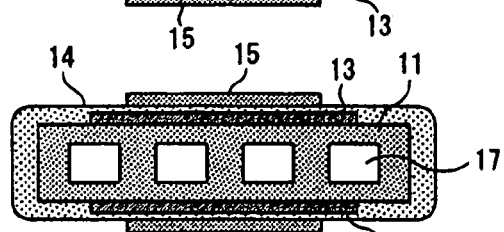
Figure 3:
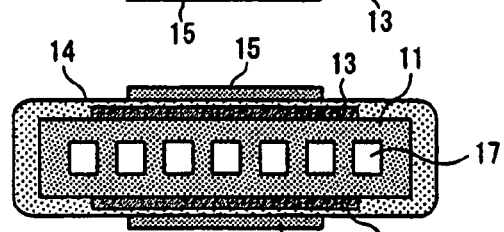
Figure 3:
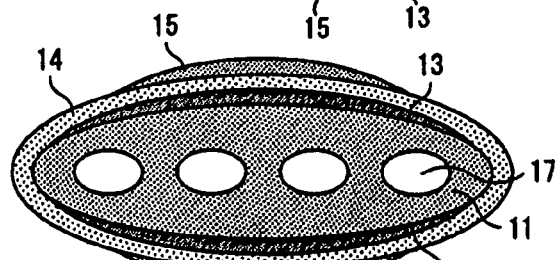
Figure 3:
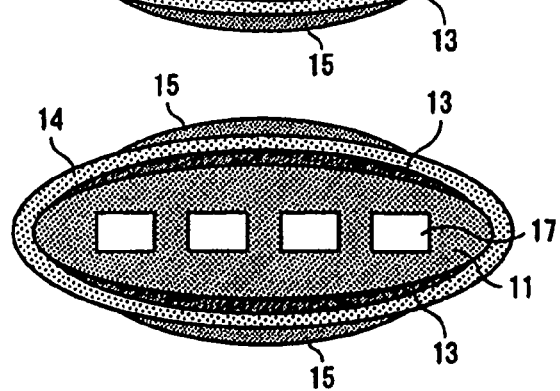

The substrate with the internal fuel flow part provided therein, at least the face thereof, in contact with the cells, and the interconnectors, being the insulator, may be of any structure provided that fuel can be distributed internally, and the plurality of the cells can be disposed on the outer surface thereof. FIGS. 3(a) to 3(g) are views showing some examples of the substrate. In those figures, parts in common with those in FIGS. 3(a) to 3(c), respectively, are denoted by like reference numerals. FIG. 3(a) shows an example of the porous insulator substrate rectangular or flat, in cross-section, showing the case of the insulator substrate 11 provided with one hollow region. The hollow region functions as a fuel flow path, that is, the internal fuel flow part 17. FIGS. 3(b) to 3(e) are views showing examples of the porous insulator substrate rectangular or flat, in cross-section, respectively, showing the cases of the respective insulator substrates provided with a plurality of hollow regions, that is, a plurality of the internal fuel flow parts 17. FIGS. 3(f) and 3(g) are views showing examples of the porous insulator substrate circular or elliptical, in cross-section, respectively, showing the cases of the respective insulator substrates 11 provided with a plurality of fuel flow paths, that is, a plurality of the internal fuel flow parts 17. With the examples shown in FIGS. 3(b) to 3(g), respectively, the cross-sectional shape of the internal fuel flow part 17 is not limited to the respective shapes shown in those figures, and may be other appropriate shape.

Figure 4:
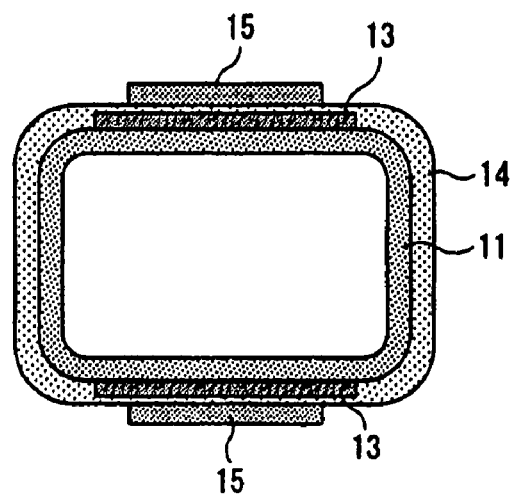
FIGS. 4(a) to 4(c) are views showing examples of the structure of "a substrate with an internal fuel flow part provided therein, at least a face thereof, in contact with cells, and interconnectors, being an insulator"
Figure 4:
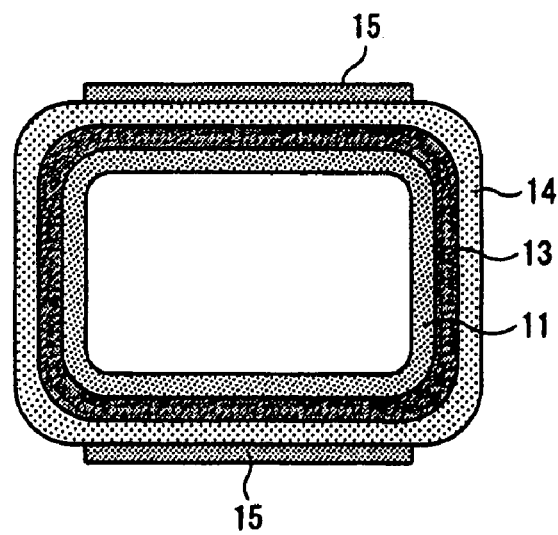
Figure 4:
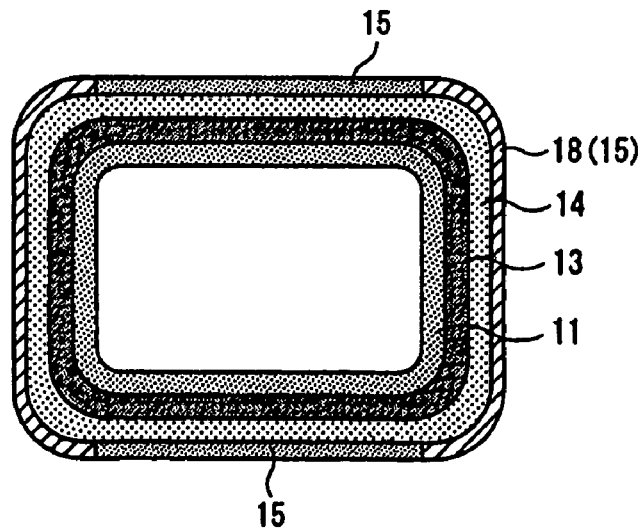

FIGS. 4(a) to 4(c) are views showing the substrate structured to be in shape quadrilateral or substantially quadrilateral in cross-section, respectively. In those figures, parts in common with those in FIGS. 3(a) to 3(g), respectively, are denoted by like reference numerals. With an example shown in FIG. 4(a), an anode 13 is disposed on both an upper side face, and an underside face of an insulator substrate 11, and an electrolyte 14 is disposed on the entire peripheral surface of the insulator substrate 11, including the anodes 13. Then, a cathode 15 is disposed on portions of the surface of the electrolyte 14, corresponding to the respective anode 13, on the upper side and the underside. With an example shown in FIG. 4(b), an anode 13 is disposed on the entire peripheral surface of an insulator substrate 11, and an electrolyte 14 is disposed on the entire peripheral surface of the anode 13. Then, a cathode 15 is disposed on portions of the surface of the electrolyte 14, on the upper side, and underside, respectively. With an example shown in FIG. 4(c), an anode 13 is disposed on the entire peripheral surface of an insulator substrate 11, and an electrolyte 14 is disposed on the entire peripheral surface of the anode 13. Then, a cathode 15 is disposed on portions of the surface of the electrolyte 14, on the upper side, and underside, respectively, and a cathode 15 or an electric conductor 18 is disposed on portions of the surface of the electrolyte 14, other than the portions of the surface thereof, where the respective cathodes 15 are disposed. In FIGS. 4(a) to 4(c), there are shown the cases of the substrate quadrilateral or substantially quadrilateral in cross-section, however, the same applies to the cases of the substrate other than that in cross-section, such as other polygonal, elliptical, and so forth, in cross-section. In other respects, the substrate is the same in structure as that shown in FIGS. 2 and 3.

Structure of the Substrate

Figure 5:
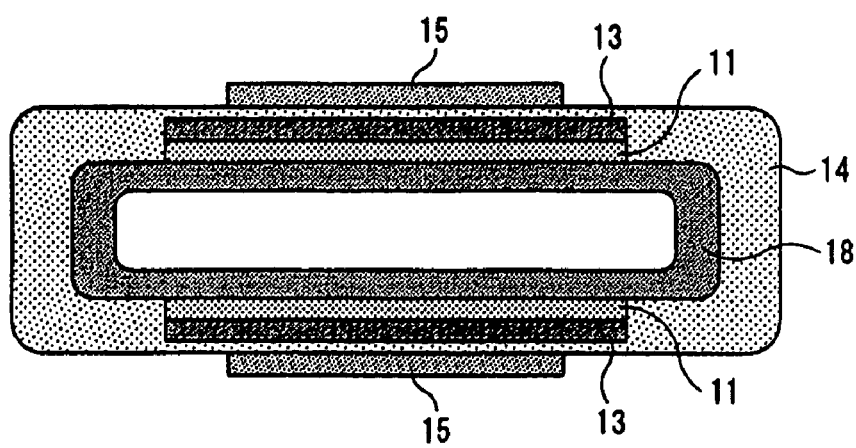
FIGS. 5(a) and 5(b) are views showing examples of the structure of a substrate, at least a face thereof, in contact with cells, being an insulator.
Figure 5:
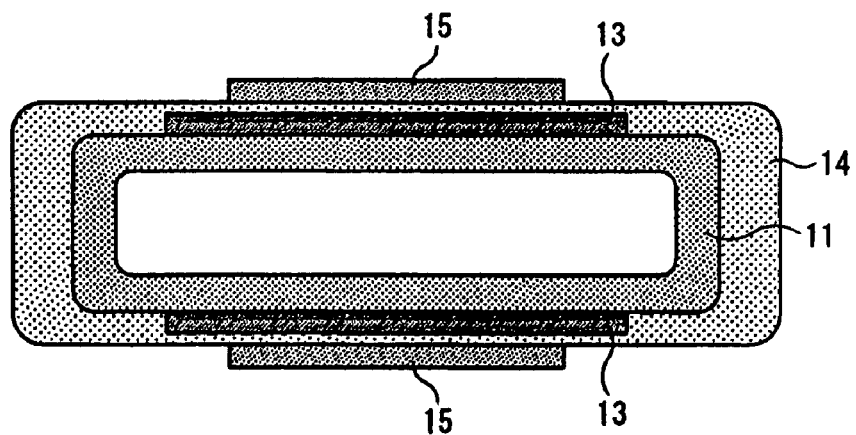

With the invention, for the substrate, use is made of a substrate with an internal fuel flow part provided therein, at least the face thereof, in contact with the cells, and the interconnectors, being a porous insulator. FIGS. 5(a) and 5(b) are views showing examples of the structure of the substrate, at least the face thereof, in contact with the cells, being an insulator. In those figures, parts in common with those in FIGS. 4(a) and 4(b), respectively, are denoted by like reference numerals. With the example of the structure, shown in FIG. 5(a), portions of the substrate, in contact with respective anodes 13, are made up of a porous insulator 11 while other portions thereof is made up of an electrically conductive substance (conductive substance) 18. In this respect, the same applies to the case of the substrate of which at least a face, in contact with the interconnectors, is an insulator. With the example of the structure, shown in FIG. 5(b), there is shown the case where the substrate in whole, including the faces thereof, in contact with the cells, is made up of the porous insulator 11. In this respect, the same applies to the case of the substrate of which at least the face, in contact with the interconnectors, is an insulator. In FIGS. 5(a) and 5(b), there are shown the cases of the substrate rectangular in cross-section, however, the same applies to the cases of the substrate other than that in cross-section, such as other polygonal, elliptical, circular, and so forth, in cross-section. As for the structure of the substrate, the same applies to Working Example 2 of an SOFC module structure, according to the invention, as described hereinafter.

Working Example 2 of the SOFC Module Structure

Figure 6:
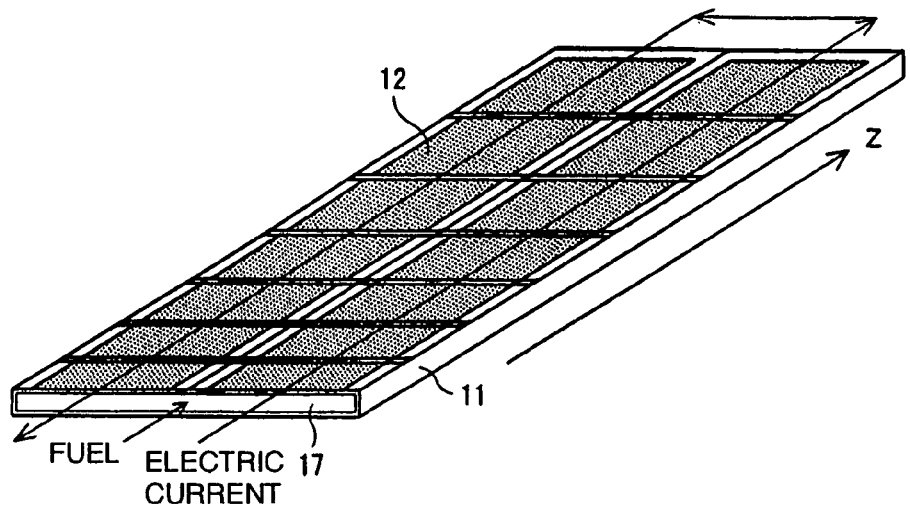
FIGS. 6(a) to 6(c) are views showing Working Example 2 of an SOFC module structure according to the invention.
Figure 6:
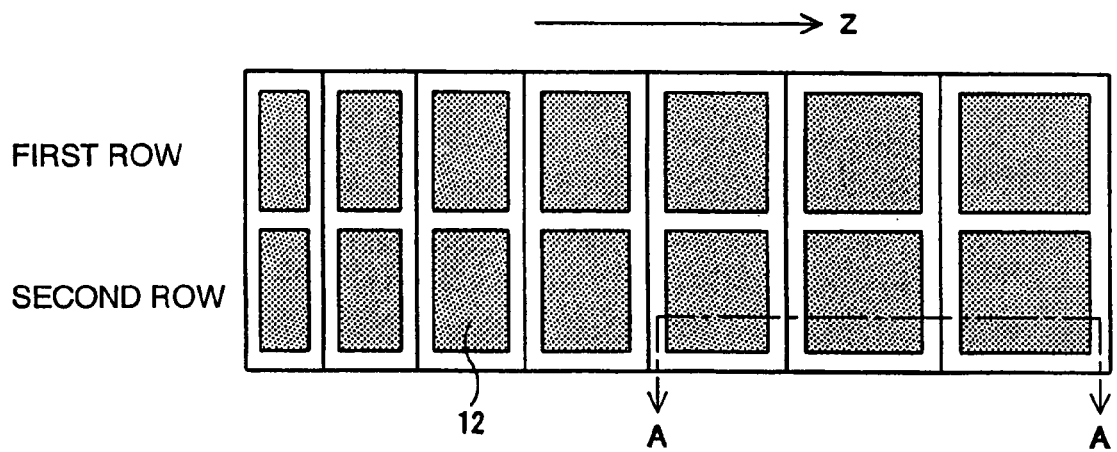
Figure 6:
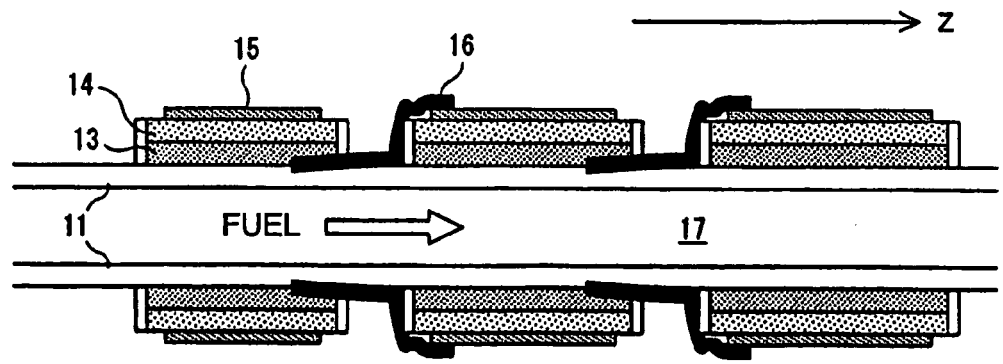

FIGS. 6(a) to 6(c) are views showing Working Example 2 of the SOFC module structure, according to the invention. FIG. 6(a) is a perspective squint view, FIG. 6(b) a plan view, and FIG. 6(c) a sectional view taken on line A-A in FIG. 6(b), showing the SOFC module structure as expanded so as to be larger than that in FIG. 6(b). As shown in FIGS. 6(a) to 6(c), in each of a plurality of rows from first to n-th rows, on either the upper side face or the underside face, or both the faces of an insulator substrate rectangular or hollow-flat, in cross-sectional shape, there are formed a plurality of cells 12 each made up of an anode 13, an electrolyte 14, and a cathode 15, stacked in sequence, and the cells 12 adjacent to each other are electrically connected in series through the intermediary of respective interconnectors. In FIGS. 6(a) to 6(c), there is shown the case of two rows of the first and second rows, however, the same applies to the case of three or more rows. In FIG. 6(a), there is shown the direction of current flow between the cells on the top face (surface) of the SOFC module, however, the direction of current flow between the cells disposed on the underside face (rear face) of the SOFC module is the same. The SOFC module is structured such that the respective cells are varied in area along the direction of the fuel flow. In FIGS. 6(a) to 6(c), there is shown one case where the respective cells sequentially increase in area along the direction of the fuel flow, as indicated by an arrow (→Z). Besides the above, as with the case of Working Example 1 of the SOFC module structure, the SOFC module may be structured with respect to the respective rows as described under items (1) to (3) given hereunder:

(1) One cell group is made up of a plurality of the cells identical in area. There are sequentially disposed the cell groups with the respective cells thereof, sequentially increasing in area along the direction of the fuel flow.
(2) One cell group is made up of a plurality of cells identical in area. There are sequentially, and alternately disposed the cell groups, and the cells not belonging to any of the cell groups (that is, individual cells) along the direction of the fuel flow while the areas of the respective cells are sequentially increased.
(3) One cell group is made up of a plurality of cells identical in area. There are disposed the cell groups, and the cells not belonging to any of the cell groups (that is, individual cells) sequentially along the direction of the fuel flow, but at random, while the areas of the respective cells are sequentially increased along the direction of the fuel flow.

Further, the SOFC module is structured such that the cells disposed in the respective rows, on a row-to-row basis, that is, on a sub-module unit basis, are varied in area along the direction of the fuel flow by the row. FIGS. 7(a), 7(b), and FIGS. 8(a), 8(b) are views showing several examples of such modes, respectively. In those figures, respective rows from first to fourth rows indicate respective sub-SOFC modules, omitting description of the interconnectors. In those examples, a plurality of the sub-modules are disposed such that faces thereof, with the cells disposed thereon, are in parallel with each other, and in those figures, to show a mode of cell lineup, there are shown the faces thereof, on the side of the cell lineup. As shown in, for example, a figure on the right side in FIG. 9(a), FIGS. 10(a), 10(b), and so forth, referred to later on, fuel is sequentially fed from the sub-module in the forefront row to the sub-module in the row adjacent thereto, and so on. In FIGS. 7(a), 7(b), and 8(a), 8(b), reference numeral 19 denotes a fuel flow path for respective SOFC sub-modules. Further, those figures show the case of the SOFC modules having four rows, however, the same applies to the case of the SOFC module having two to three rows, or five or more rows.

Figure 7:
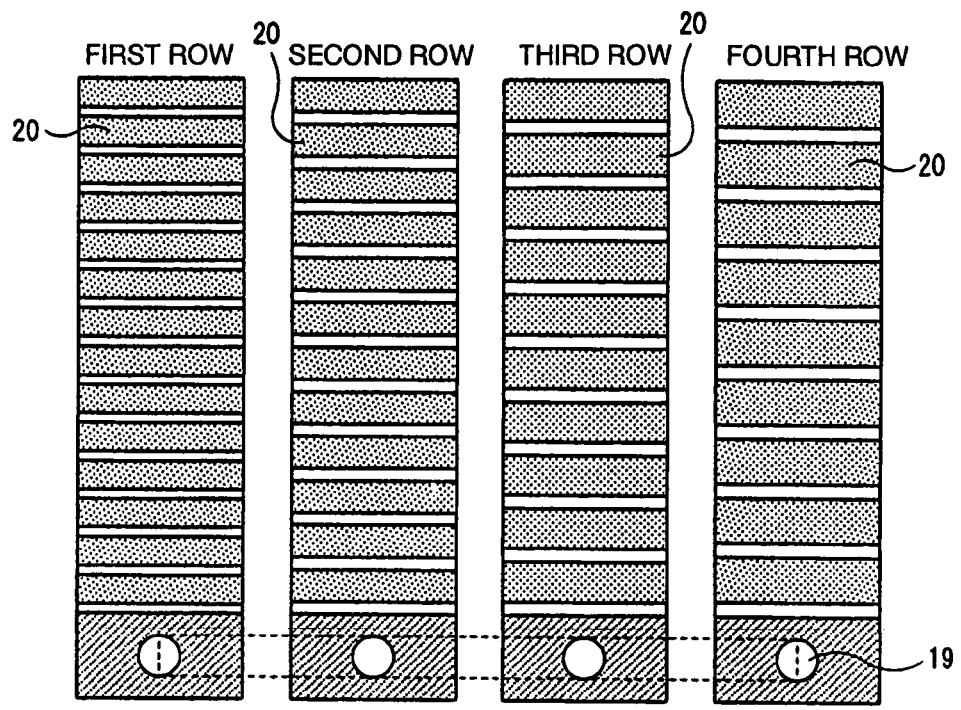
FIGS. 7(a), 7(b), and FIGS. 8(a), 8(b) are views showing several examples of structure modes, respectively, in which cells disposed in respective rows of an SOFC module are varied in area along the direction of fuel flow by the row.
Figure 7:
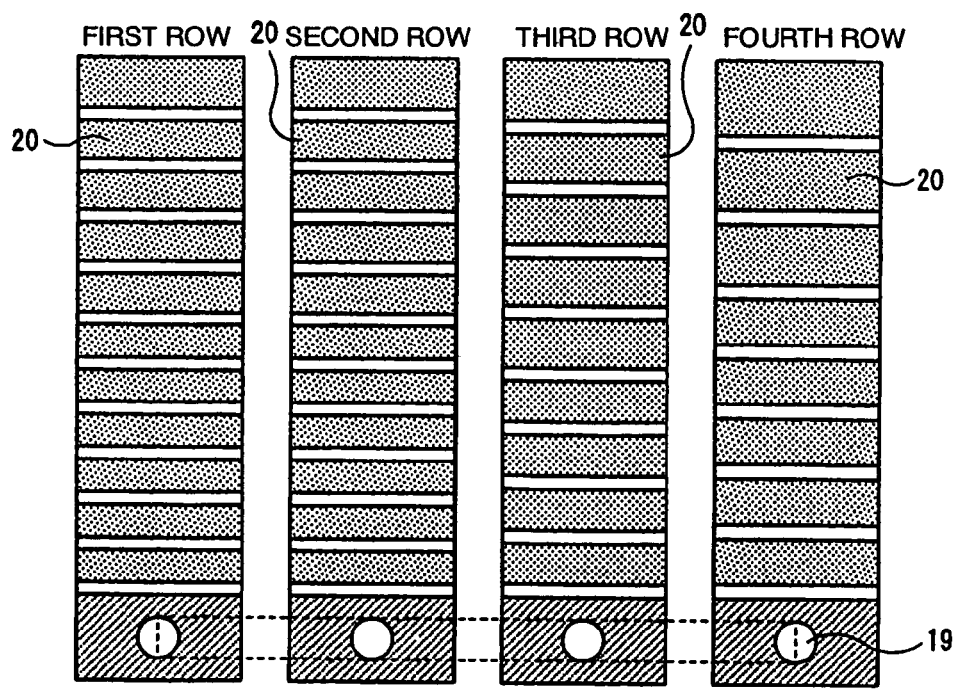

The example shown in FIG. 7(a) represents the case where the areas of the respective cells sequentially increase on the sub-module unit basis. In FIG. 7(a), the SOFC module is structured such that the areas of the respective cells 20 in the first row are small, the areas of the respective cells 20 in the second row, on the right side of the first row, are larger than those in the first row, the areas of the respective cells 20 in the third row, on the right side of the second row, are larger than those in the second row, and the areas of the respective cells 20 in the fourth row, on the rightmost side, are larger than those in the third row.

The example shown in FIG. 7(b) represents the case where the areas of respective cells are varied within a group of the cells, on a row-to-row basis, that is, within a sub-module unit, and further, the areas of respective cells are varied by the sub-module. In FIG. 7(b), the SOFC module is structured such that the respective areas of six cells 20 (a group of six cells identical in area), on the lower end sides of both the first row on the leftmost side, and the second row next to the first row, are smaller while the respective areas of five cells 20 (a group of five cells identical in area) above the six cells 20 are larger than those of the six cells 20. With respect to the third row on the right side of the second row, four cells 20 (a group of four cells identical in area) on the lower end side thereof are structured so as to be smaller in area while five cells 20 (a group of five cells identical in area) above the four cells 20 are structured so as to be larger in area than the four cells 20. With respect to the fourth row on the rightmost row, five cells 20 (a group of five cells identical in area) on the lower end side thereof are structured so as to be smaller in area while three cells 20 (a group of three cells identical in area) above the five cells 20 are structured so as to be larger in area than the five cells 20.

Figure 8:
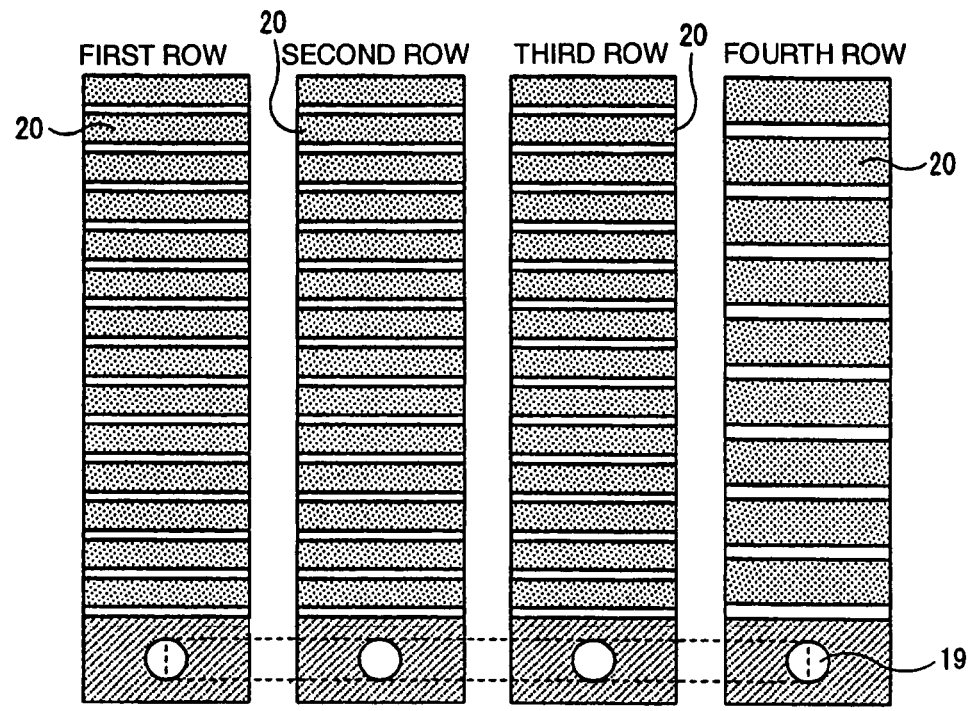
Figure 8:
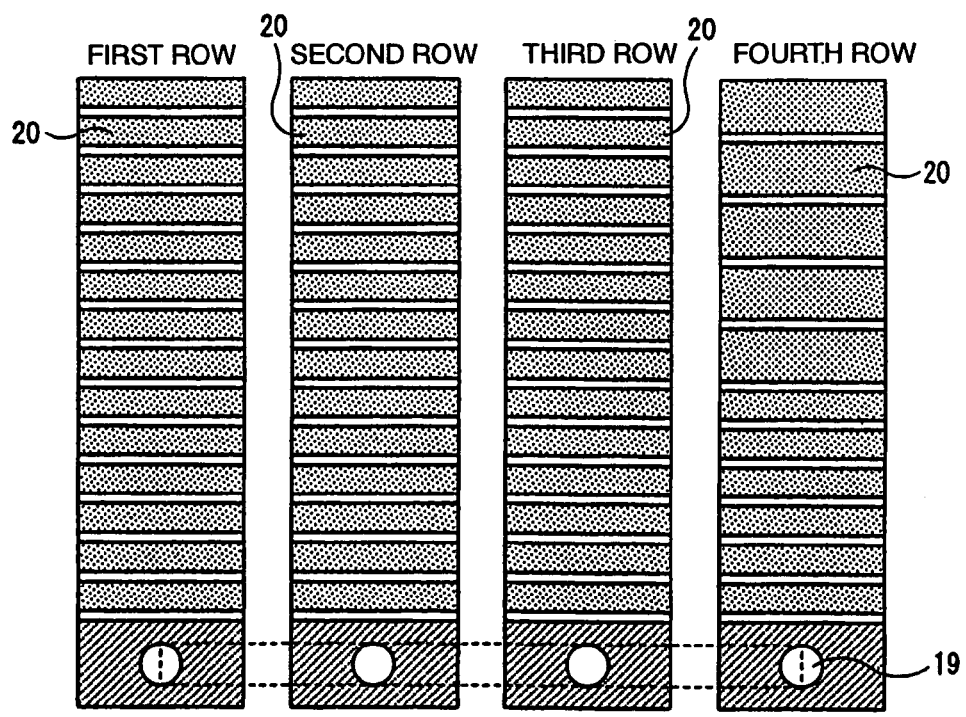

With the example shown in FIG. 8(a), the respective cells 20 in each of the rows from the first row on the leftmost side to the third row are structured so as to be identical in area while the respective cells 20 in the fourth row are structured so as to be larger in area than the cells 20 in the respective rows from the first row to the third row. With the example shown in FIG. 8(b), the respective cells 20 in each of the rows from the first row on the leftmost side to the third row are structured so as to be identical in area, and with respect to the respective cells 20 in the fourth row on the rightmost side, six cells 20 (a group of six cells identical in area) on the lower end side thereof are structured so as to be smaller in area while five cells 20 (a group of five cells identical in area) above the six cells 20 are structured so as to be larger in area than the six cells 20.

In the cases of the examples of modes shown in FIGS. 7(a), 7(b), and 8(a), 8(b), respectively, electric power is drawn out between the cell at the forefront of the first row, in the direction of the fuel flow, and the cell at the rearmost of the fourth row, in the direction of the fuel flow. The fuel is consumed at the respective cells to thereby become gradually thinner along the direction of the fuel flow, however, since the respective cells or the respective cathodes thereof are varied in area along the direction of the fuel flow on a cell group unit basis, or a sub-module unit basis, the same effect as that in the case of Working Example 1 of the SOFC module structure, described hereinbefore, can be obtained. In addition, since the plurality of the cells are formed in each of the plurality of the rows from the first row to the n-th row, so as to be electrically connected in series, a multitude of the cells can be lined up. Accordingly, a large amount of electric power can be obtained with a compact structure.

Working Examples of a Structure of Solid Oxide Fuel Cell Coupled Modules

There are described hereinafter Working Examples of a structure of solid oxide fuel cell bundled modules, according to the invention, that is, the structure for coupling up the solid oxide fuel cells made up as described in the foregoing.

Working Example 1 of a Structure of SOFC Bundled Modules

Figure 9:
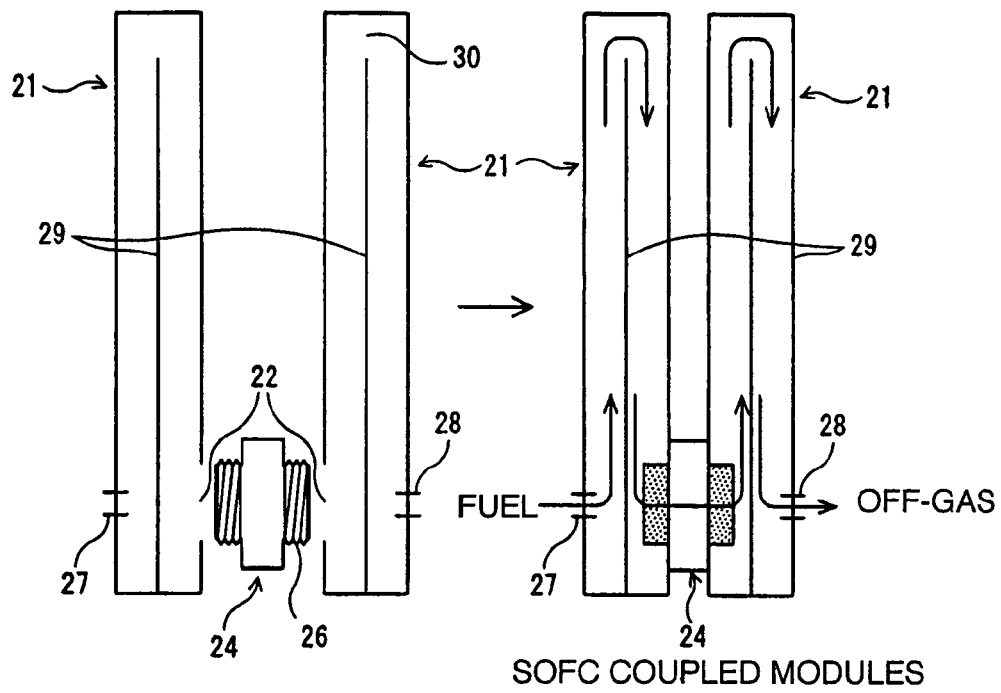
FIGS. 9(a) to 9(c) are views showing Working Example 1 of a structure for coupling up the SOFC modules according to the invention.
Figure 9:
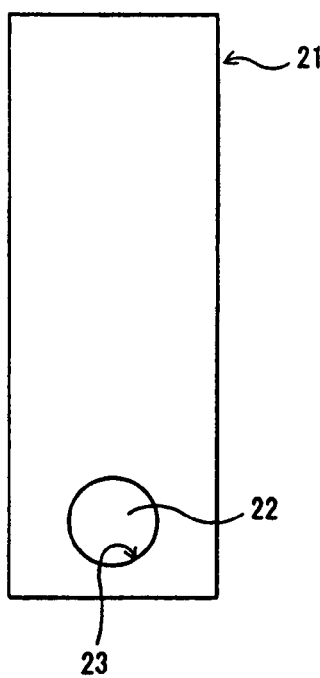
Figure 9:
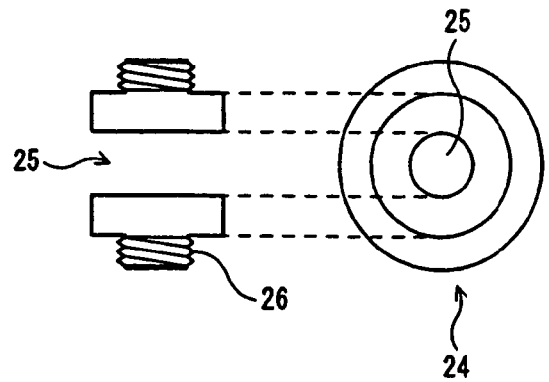

FIGS. 9(a) to 9(c) are views showing Working Example 1 of a structure for coupling up two units of the SOFC modules. In those figures, description of the cells and so forth, disposed on the respective modules is omitted. The same applies to Working Examples referred to in the following figures up to FIG. 18. As show in FIG. 9(b), a female-threaded hole 22 is provided in the lower part of the SOFC module 21, on one-side face thereof, that is, on the fuel inlet side thereof, and the two units of the SOFC modules are disposed, opposite to each other, with an interval provided therebetween, and in such a way as to be plane parallel with each other. In FIG. 9(b), reference numeral 23 denotes female-threads. An interval-retaining hollow member 24 having a hollow protrusion provided with external threads so as to mate with the female-threaded holes 22 adjacent thereto is interposed between the two units of the SOFC modules, which are securely held with each other by rotatively reciprocating the interval-retaining hollow member 24. FIG. 9(c) is a view showing the interval-retaining hollow member 24, and reference numeral 25 denotes a hollow part thereof, that is, a through-hole, reference numeral 26 denoting external-threads to be mated with the female-threads 23. Since as the female-threads 23 of the respective female-threaded hole 22, use is made of female-threads corresponding to the external-threads 26 provided on the hollow protrusion of the interval retaining hollow member 24, both the modules 21 can be coupled up and securely held with each other by simply rotatively reciprocating the interval-retaining hollow member 24.

The figure shown in the right side part of FIG. 9(a) shows the solid oxide fuel cell bundled modules structured as above, and the direction of fuel flow is indicated by an arrow (↑). In FIG. 9(a), reference numeral 27 denotes a fuel guide pipe, and 28 an off-gas emission pipe. A partition plate 29, as shown, for example, in the figure, is kept disposed inside the respective modules 21 in such a way as to maintain spacing against the inner walls of the respective modules 21, at the upper end thereof. Reference numeral 30 denotes the spacing. Fuel fed into the lower end of the module, on the left side in the figure, rises along the partition plate 29, as indicated by the arrow (↑), is turned back at the spacing 30 in the upper part of the module before descending, enters the module on the right side in the figure after passing through the through-hole 25 of the interval retaining hollow member 24, rises again, is turned back at the spacing 30, at the upper end of the partition plate 29, before descending, and is subsequently discharged as spent fuel, that is, as an off-gas, from the lower end of the module on the right side. The partition plate 29 in the figure is shown by way of example, and it may be of any suitable construction if it is capable of distributing the fuel by turning the same back in such a way as described. In those respects, the same applies to Working Examples that will be described hereinafter. Further, in the figures corresponding to respective Working Examples described hereinafter, the direction of fuel flow is indicated by the arrow (↑) as appropriate.

Working Example 2 of a Structure of SOFC Bundled Modules

Figure 10:
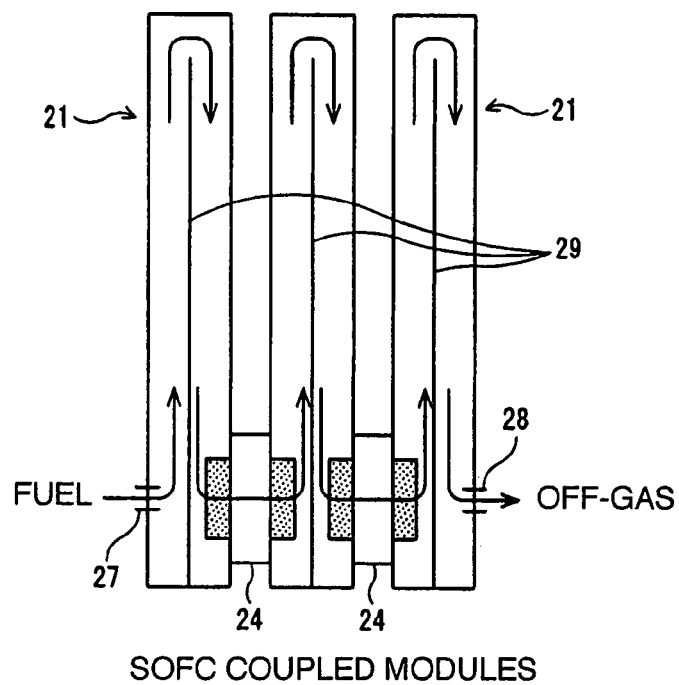
FIGS. 10(a), and 10(b) are views showing Working Example 2 of a structure for coupling up the SOFC modules according to the invention.
Figure 10:
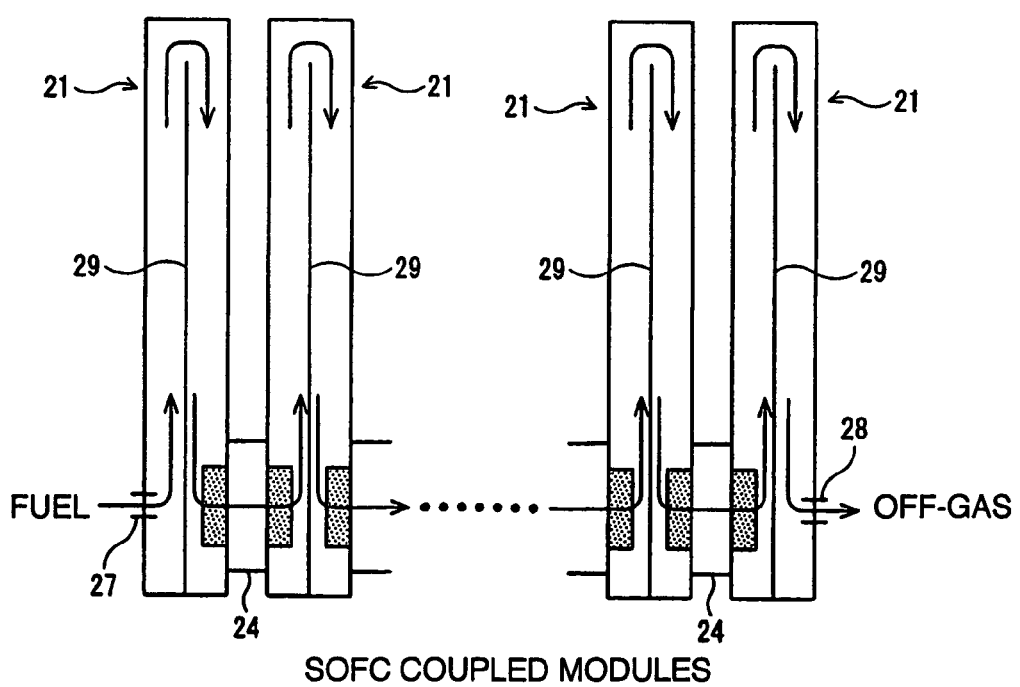

Working Example 2 represents a structure wherein 3 or more units of the SOFC modules are coupled up by the same technique as that for Working Example 1 described as above. FIGS. 10(a), and 10(b) are views showing Working Example 2, in which FIG. 10(a) is a view showing the case of coupling up 3 units of the SOFC modules to be securely held with each other, and FIG. 10(b) is a view showing the case of coupling up 4 or more plural units of the SOFC modules to be securely held with each other. In those figures, parts in common with those in FIGS. 9(a) to 9(c), respectively, are denoted by like reference numerals. Of the modules disposed at both ends, respectively, the module 21 at the extreme left end of the SOFC bundled modules has a female-threaded hole provided in the lower part (on the side of spent fuel emission) on one-side face thereof, and the module 21 at the extreme right end of the SOFC bundled modules has a female-threaded hole provided in the lower part (on the side of fuel feeding) on one-side face thereof while the modules 21 disposed between the modules at both the right and left ends, respectively, is provided with a female-threaded hole on respective faces thereof, on the side of the fuel feeding, and on the side of the spent fuel emission. As shown in FIGS. 10(a), and 10(b), the plural units of the modules are disposed in such a way as to be plane parallel with each other with an interval provided between those adjacent to each other to be thereby securely held together. An interval retaining hollow member 24 for use in this case is the same in respect of construction, manner of securely holding the modules, and so forth as that for Working Example 1 described as above.

Working Example 3 of a Structure of SOFC Bundled Modules

Figure 11:
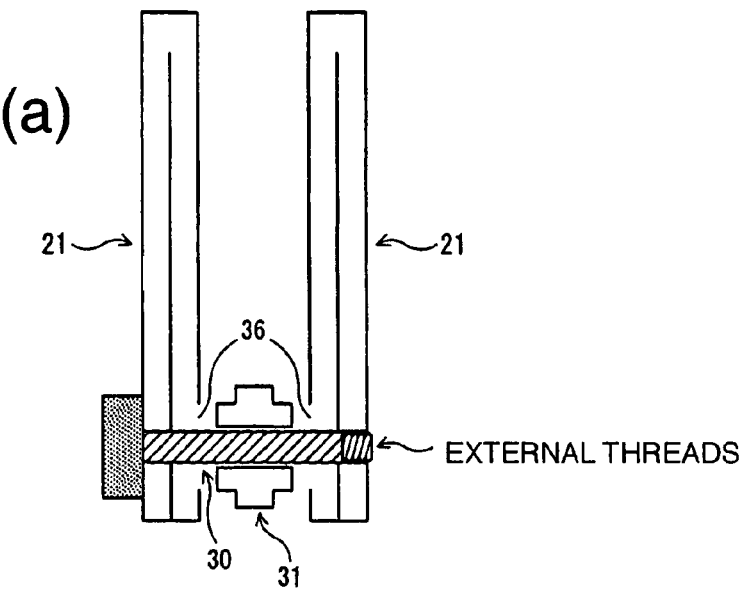
FIGS. 11(a) to 11D, and FIGS. 12(a), 12(b) are views showing Working Example 3 of a structure for coupling up the SOFC modules according to the invention.
Figure 11:
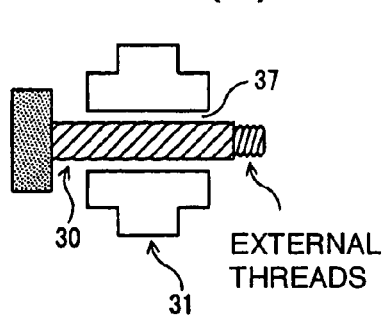
Figure 11:
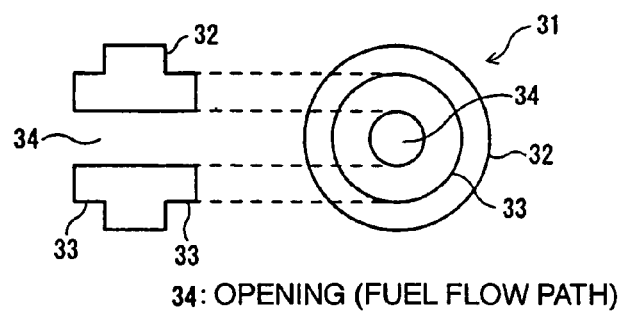
Figure 11:
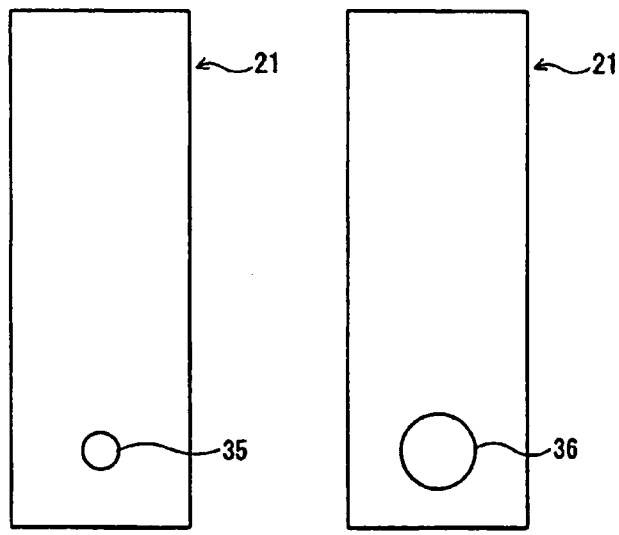

Working Example 3 represents another structure for coupling up the SOFC modules. FIGS. 11(a) to 11D, and FIGS. 12(a), 12(b) are views showing Working Example 3. FIG. 11(a) is a view showing a state where 2 units of the modules 21 provided with an opening 36, respectively, are disposed side by side, an interval-retaining hollow member 31 having a hollow protrusion is interposed between the openings 36, and a screw bolt 30 is inserted in the openings 36. FIGS. 11(b) and 11(c) are views showing a construction of the interval-retaining hollow member 31. The interval-retaining hollow member 31 has a protrusion 32, a skirting part 33 provided on both sides thereof, and a through-hole 34 penetrating therethrough. The through-hole 34 is larger in diameter than the shank of the screw bolt 30 to be inserted therein, and the skirting part 33 is structured such that the outside diameter thereof is larger than the diameter of the through-hole 34.

Further, a figure on the left-hand side in FIG. 11(d) is a view showing a face of the module 21, on the head side of the screw bolt to be inserted, having a hole 35 corresponding to the diameter of the shank of the screw bolt. A figure on the right-hand side in FIG. 11(d) is a view showing a face of the module 21, on the side thereof, opposite to the face of the module 21, on the head side of the screw bolt, having an opening 36 corresponding to the diameter of the skirting part 33 of the interval-retaining hollow member 31.

Figure 12:
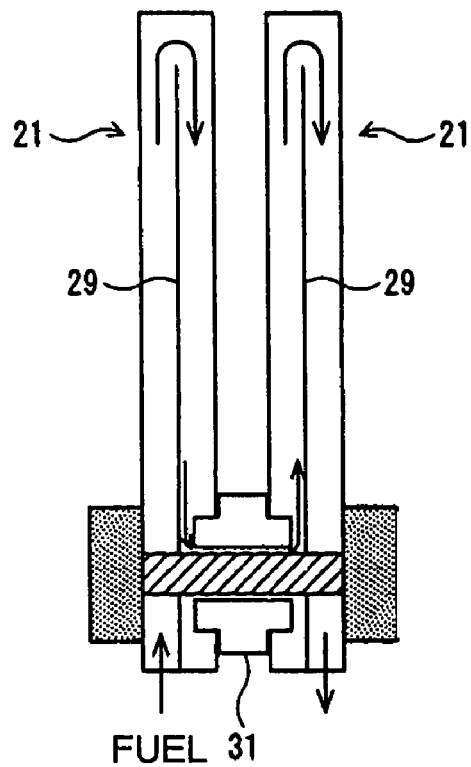
Figure 12:
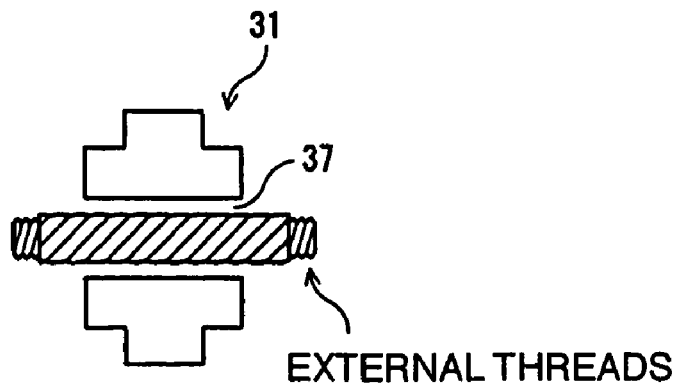

As shown in FIG. 11(a), the 2 units of the modules 21 are disposed such that respective faces thereof, on the side provided with the opening 36, oppose each other, the interval-retaining hollow member 31 is interposed therebetween, and the shank of the screw bolt 30 is inserted into both the hole 35 and the opening 36 of the module 21 on the left-hand side, and both the opening 36 and the hole 35 of the module 21 on the right-hand side. Thereafter, by tightening up a nut applied to the external threads of the screw bolt, the interval-retaining hollow member 31 is securely held between both the modules 21, in intimate contact therewith. FIG. 12(a) shows the SOFC bundled modules made up in this way. Use may be made of a screw bolt of a type to be tightened up with nuts from both sides of the screw bolt. FIG. 12(b) is a view showing a configuration between the interval-retaining hollow member 31, and the shank, in such a case.

In the case of the present SOFC bundled modules, fuel is fed into the lower end of the module 21 on the left side in the figure, rises along the partition plate 29 as indicated by the arrow (↑), is turned back at the upper end of the partition plate 29 before descending, enters the module on the right side after passing through spacing 37 between the shank of the screw bolt, and the through-hole 34 of the interval-retaining hollow member 31, rises again, is turned back at the upper end of the partition plate 29, before descending, and is subsequently discharged as an off-gas, from the lower end of the module on the right side, as shown in FIG. 12(a).

Working Example 4 of a Structure of SOFC Bundled Modules

Figure 13:
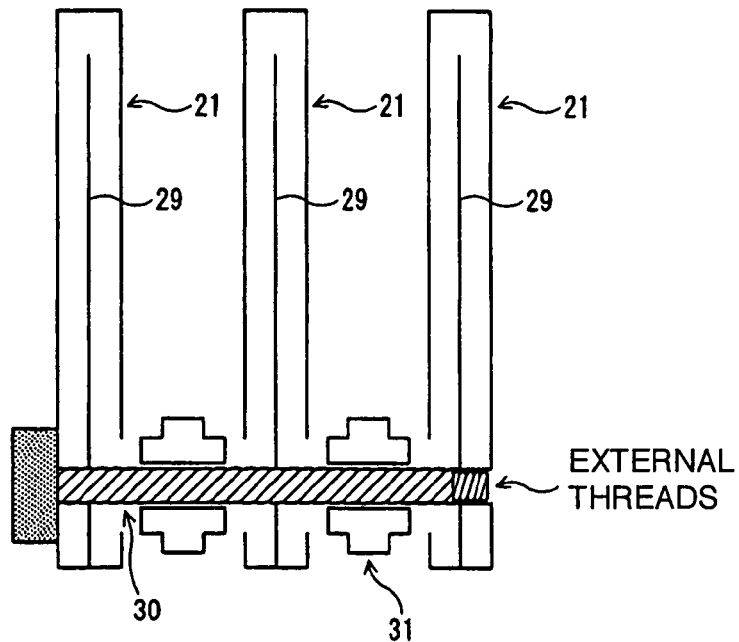
FIGS. 13(a), and 13(b) are views showing Working Example 4 of a structure for coupling up the SOFC modules according to the invention.
Figure 13:
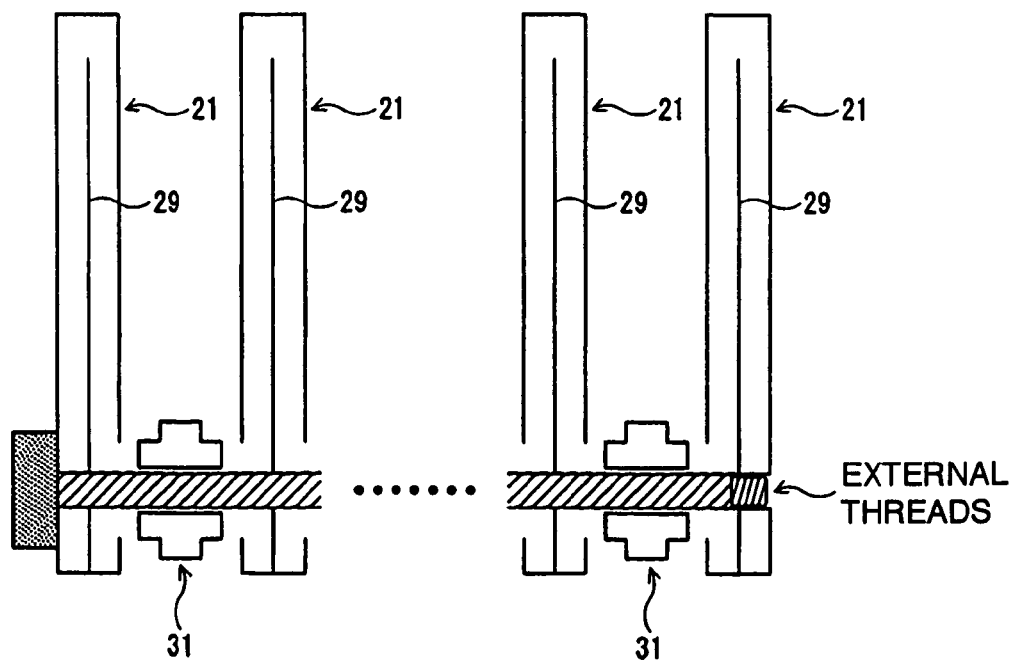

Working Example 4 represents a structure wherein 3 or more units of the SOFC modules are coupled up by the same technique as that for Working Example 3 described as above. FIGS. 13(a), and 13(b) are views showing Working Example 4, in which FIG. 13(a) is a view showing the case of coupling up 3 units of the SOFC modules to be securely held with each other, and FIG. 13(b) is a view showing the case of coupling up 4 or more plural units of the SOFC modules to be securely held with each other. With the module 21 disposed between the modules 21 on both the right and left ends, respectively, a face thereof, on both side, are provided with an opening 36 corresponding to the diameter of a skirting part 33 of an interval retaining hollow member 31, as shown in the figure on the right-hand side in FIG. 11(d). The modules 21 on both the right and left ends, respectively, are the same in structure as those for Working Example 3.

As shown in FIGS. 13(a), and 13(b), the respective modules 21 are disposed so to be in plane parallel with each other, the interval retaining hollow member 31 is provided between those adjacent to each other, respectively, and the shank of a screw bolt 30 is inserted from one end thereof into the respective modules 21 as with the case of Working Example 3. Subsequently, in the case of the screw bolt 30 provided with a head at one end thereof, the screw bolt 30 is tightened up with a nut from the other end thereof, or in the case of the screw bolt 30 to be tightened up with a nut at both ends thereof, the screw bolt 30 is tightened up with the nut from both the ends thereof, thereby coupling up the respective modules 21 so as to be intimately and securely held with each other. In the case, the diameter of the screw bolt 30 is rendered smaller than the diameter of the opening 36, thereby permitting the fuel to be distributed between both parts. With the SOFC bundled modules made up in this way, fuel flow is the same as that in the case of Working Example 3 described as above.

Working Example 5 of a Structure of SOFC Bundled Modules

Figure 14:
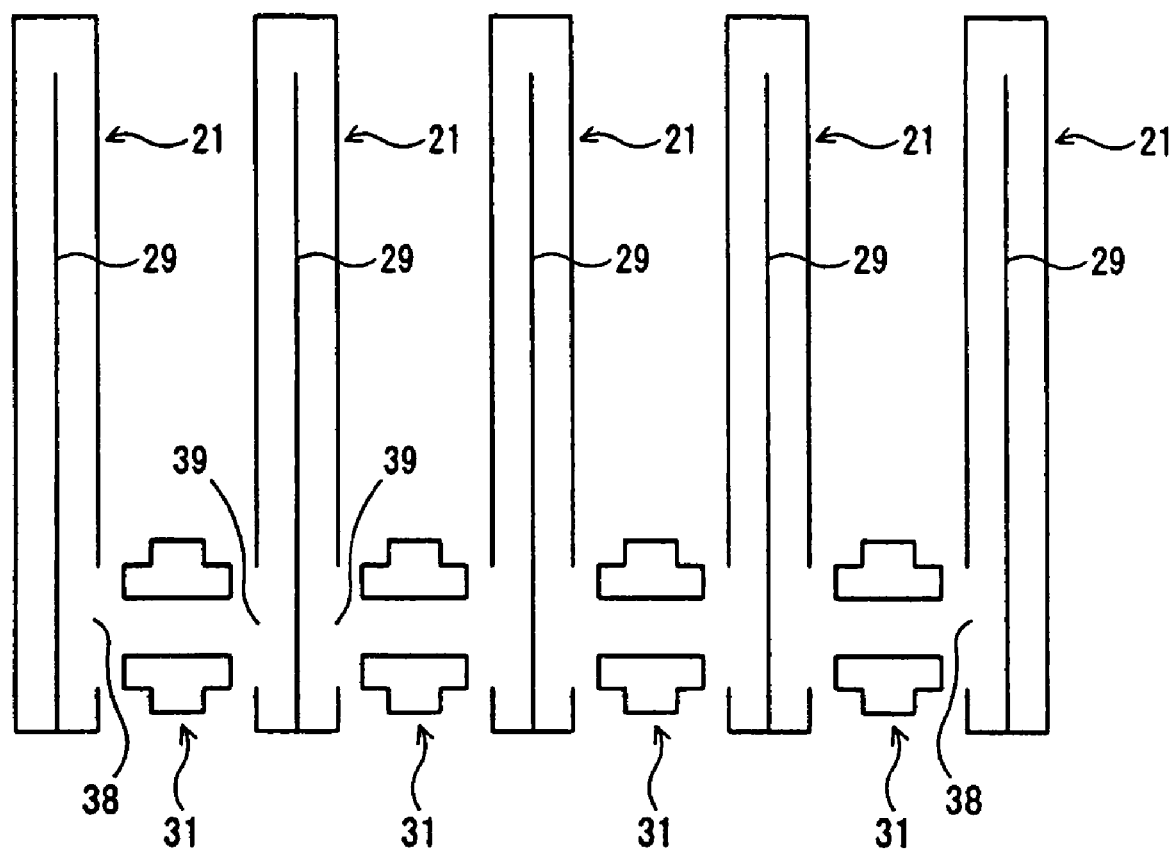
FIG. 14, FIGS. 15(a), and 15(b) are views showing Working Example 5 of a structure for coupling up the SOFC modules according to the invention.
Figure 15:
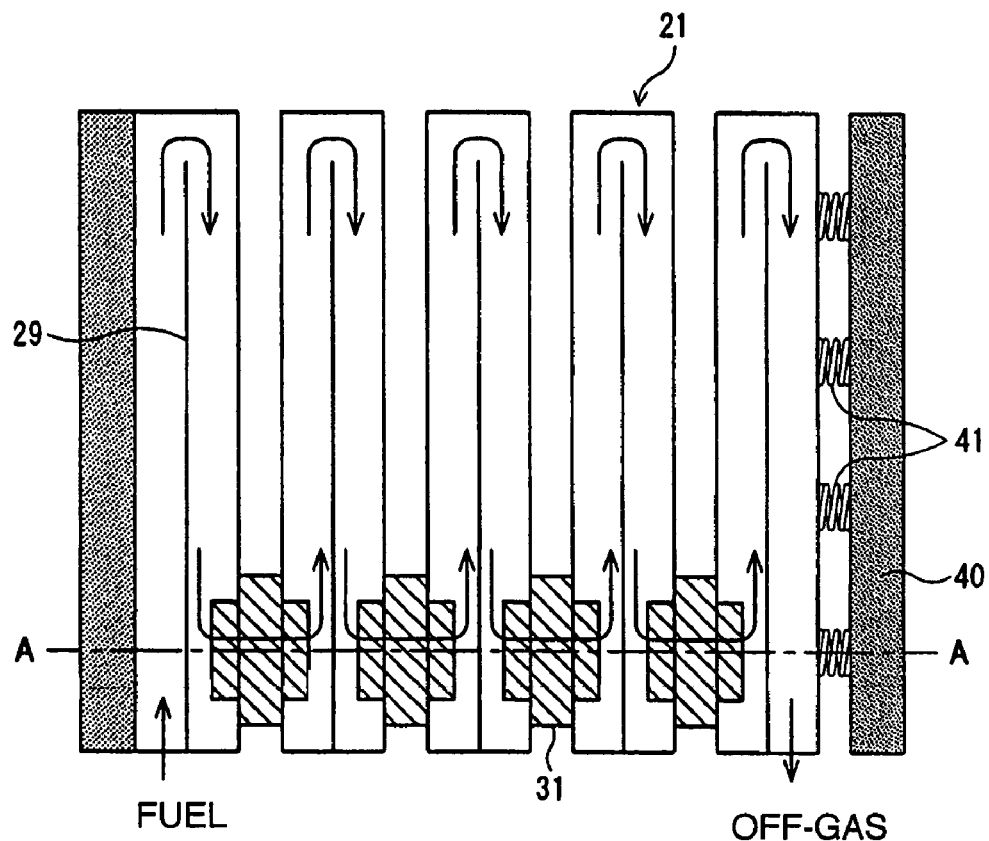
Figure 15:
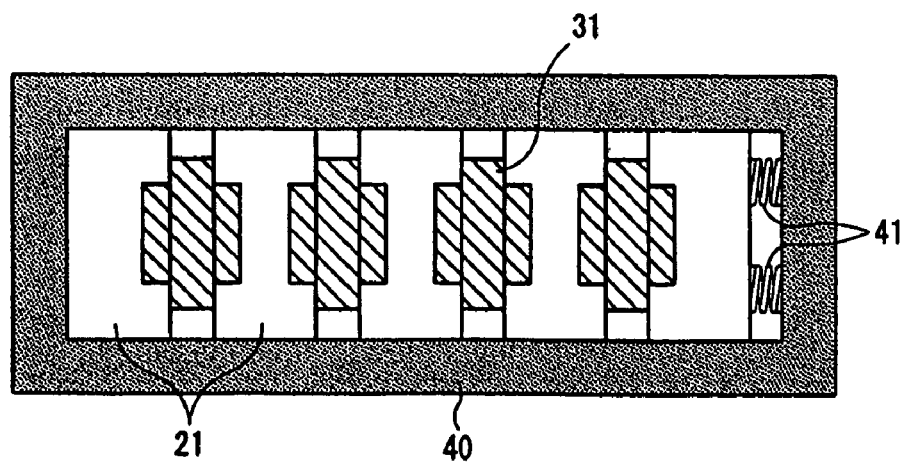

Working Example 5 represents a structure wherein 2 or more units of the SOFC modules are coupled up without use of a screw bolt while Working Examples 3 and 4 of the structure of the SOFC bundled modules represent the case of securely holding the modules together by inserting the screw bolt into the interval retaining hollow member. FIG. 14, FIGS. 15(a), and 15(b) are views showing the present Working Example 5, showing the case where 5 units of the modules are disposed in plane parallel with each other to be thereby coupled up. FIG. 14 is a view showing the process of coupling up the modules, and FIGS. 15(a), and 15(b) are views showing a configuration of the modules coupled up. FIG. 15(a) is a longitudinal sectional view, omitting description of a heat-insulating material located at the top and bottom of each of the modules, a fuel guide pipe, and so forth. FIG. 15(b) is a sectional view taken on line A-A in FIG. 15(a).

As shown in FIG. 14, among the 5 units of the modules 21, the modules at both the right and left ends, respectively, each have an opening 38 provided on one side (on the side of fuel feeding) of one-side face thereof, in the longitudinal direction, and 3 units of the modules, other than those at both the right and left ends, each have an opening 39 provided on one side (on the side of fuel feeding) of each of the faces thereof, in the longitudinal direction. The respective diameters of the openings 38, 39 are equal to the outside diameter of the same skirting part 33 of the interval-retaining hollow member 31 as is shown FIG. 11(c).

As shown in FIG. 14, the interval-retaining hollow member 31 is interposed to be securely held between the openings 38, 39, opposite to each other, between the openings 39, 39, opposite to each other, and between the openings 39, 38, opposite to each other, respectively, among those openings. As means for securely holding the interval-retaining hollow member 31, use may be made of a sintering process. In this case, the respective openings, and the skirting parts 33 of the respective interval-retaining hollow members 31 are intimately and securely held with each other by sintering. The sintering process can be applied to Working Examples 6 to 8 that will be described hereinafter. Further, in implementing such secure holding as described, the modules in whole may be disposed inside a casing 40 to be thereby securely held with each other, as shown in FIGS. 15(a), and 15(b). In this case, the secure holding may be carried out by use of the sintering process in combination with the above-described method. Further, upon disposing the modules in whole inside the casing 40, an elastic member 41, such as spring, and so forth, may be disposed between either or both of the modules at both the right and left ends, and the inner wall of the casing 40, thereby intimately and securely holding those parts with each other. FIGS. 15(a), and 15(b) show the case of disposing the elastic member 41, such as a spring, and so forth, between either of the respective modules at both the right and left ends, and the inner wall of the casing 40. In FIG. 15(a), the direction of fuel distribution is indicated by an arrow (↑). FIG. 14, FIGS. 15(a), and 15(b), there is shown the case where the 5 units of the modules are coupled up, and securely held with each other, however, the same applies to the case where 2 to 4 units, or 6 or more units of the modules are coupled up, and securely held with each other.

Working Example 6 of a Structure of SOFC Bundled Modules

Figure 16:
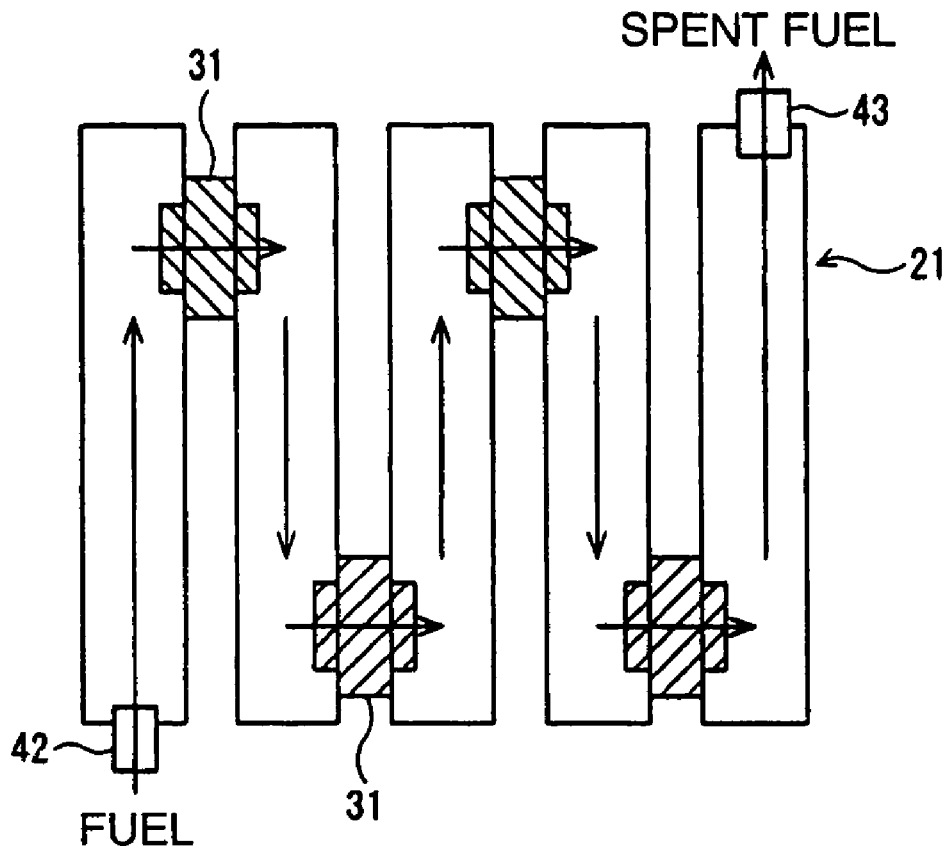
FIGS. 16(a) and 16(b) are views showing Working Example 6 of a structure for coupling up the SOFC modules according to the invention.
Figure 16:
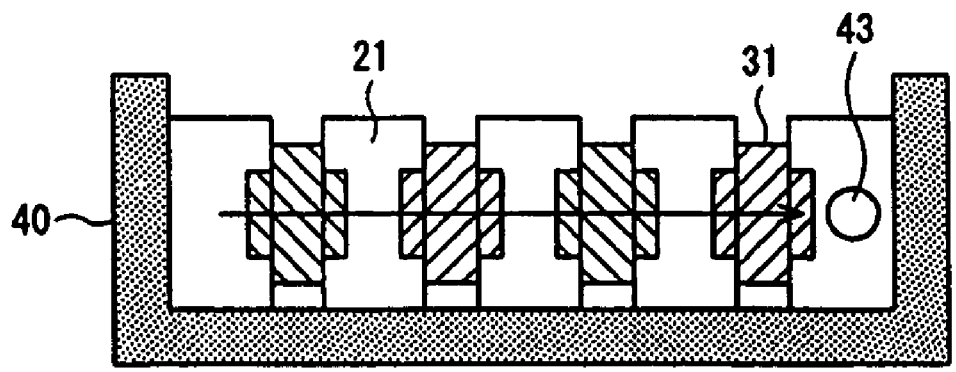

Working Example 6 represents a structure wherein the SOFC modules are coupled up on the side of spent fuel emission as well as fuel feeding while Working Examples 1 to 5 of the structure of the SOFC bundled modules, respectively, represent the case of coupling up the SOFC modules on the side of fuel feeding. FIGS. 16(a) and 16(b) are views showing the present Working Example 6. With Working Example 6, only the same interval-retaining hollow member 31 as is shown in FIG. 11(c) is used as a coupling member. Further, with Working Example 6, there is no need for installing the partition plate 29 for guiding fuel flow, required in Working Examples 1, and so forth, or a member equivalent thereto, inside the respective modules.

The respective modules are provided with an opening on the side of spent fuel emission as well as fuel feeding. The respective diameters of those openings are equal to the outside diameter of a skirting part 33 of the interval-retaining hollow member 31. In this case, however, as shown in FIGS. 16(a) and 16(b), the module at the leftmost end is provided with the opening on the side of spent fuel emission only, and the module at the rightmost end is provided with the opening on the side of fuel feeding only. Then, as shown in FIGS. 16(a) and 16(b), the interval-retaining hollow member 31 is interposed between the respective openings of the modules neighboring on each other, that is, the adjacent modules, opposite to each other, respectively, and the modules in whole are disposed inside a casing 40. In FIG. 16(b), there is shown the casing 40 in as-partially cut-away state. With the bundled modules made up by disposing a plurality of the modules as described above, fuel is fed into the module at the leftmost end from a fuel guide pipe 42 in the lower part thereof to be distributed as indicated by an arrow (↑) in FIG. 16(a) so as to contribute to power generation, and is sequentially distributed to the respective modules neighboring on each other to be thereby discharged as spent fuel, that is, an off-gas from an off-gas emission pipe 43 in the upper part of the module at the rightmost end.

Working Example 7 of a Structure of SOFC Bundled Modules

Figure 17:
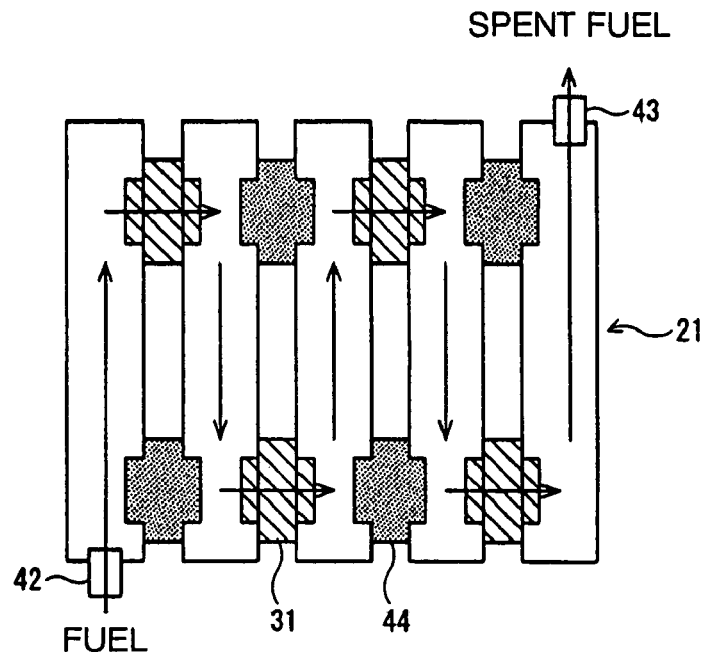
FIGS. 17(a) to 17(c) are views showing Working Example 7 of a structure for coupling up the SOFC modules according to the invention.
Figure 17:
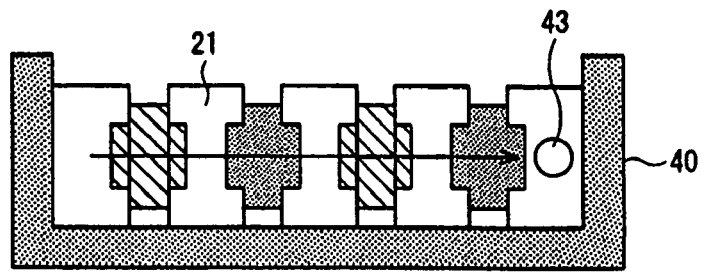
Figure 17:

Working Example 7 is the same as Working Example 6 in that the SOFC modules are coupled up on the side of spent fuel emission as well as fuel feeding, but represents a structure wherein coupling between the respective modules is implemented with an interval-retaining unhollow member as well as an interval-retaining hollow member. FIGS. 17(a) to 17(c) are views showing Working Example 7. In FIG. 17(a), description of a casing 40 is omitted, and FIG. 17(b) is a plan view of Working Example 7 shown in FIG. 17(a) as seen from above. In FIG. 17(b), there is shown the casing 40 in as-partially cut-away state. In this case, as the interval-retaining hollow member, use is made of the same interval-retaining hollow member 31 as is shown in FIG. 11(c) while as the interval-retaining unhollow member, use is made of an interval-retaining member 44 as shown in FIG. 17(c). As shown in FIG. 17(c), the interval-retaining member 44 that is not hollow is the same in construction as the interval-retaining hollow member 31 except that the former does not have the through-hole 34 provided in the interval-retaining hollow member 31, that is, a fuel flow path.

As shown in FIG. 17(a), the interval-retaining hollow member 31, and the interval-retaining member 44 that is not hollow are disposed in the upper part and lower part of the respective modules, in a staggered fashion. The interval-retaining member 44 that is not hollow functions as an interval-retaining member, thereby attaining improvement on retention of an interval between the respective modules adjacent to each other, and secure holding therebetween. Otherwise, Working Example 7 is similar to the case of Working Example 6.

Working Example 8 of a Structure of SOFC Bundled Modules

Working Example 8 has the same structure for coupling up a plurality of the SOFC modules as that for Working Examples 5, and so forth, however, the present Working Example 8 is structured such that pressure loss occurs at parts of the respective modules, where fuel inside the respective modules is released to the outside. With Working Example 8, there is no need for installing a partition plate 29 for guiding fuel flow, or a member equivalent thereto, inside the respective modules because the fuel fed into the respective modules is released from the respective modules, individually, to the outside.

Figure 18:
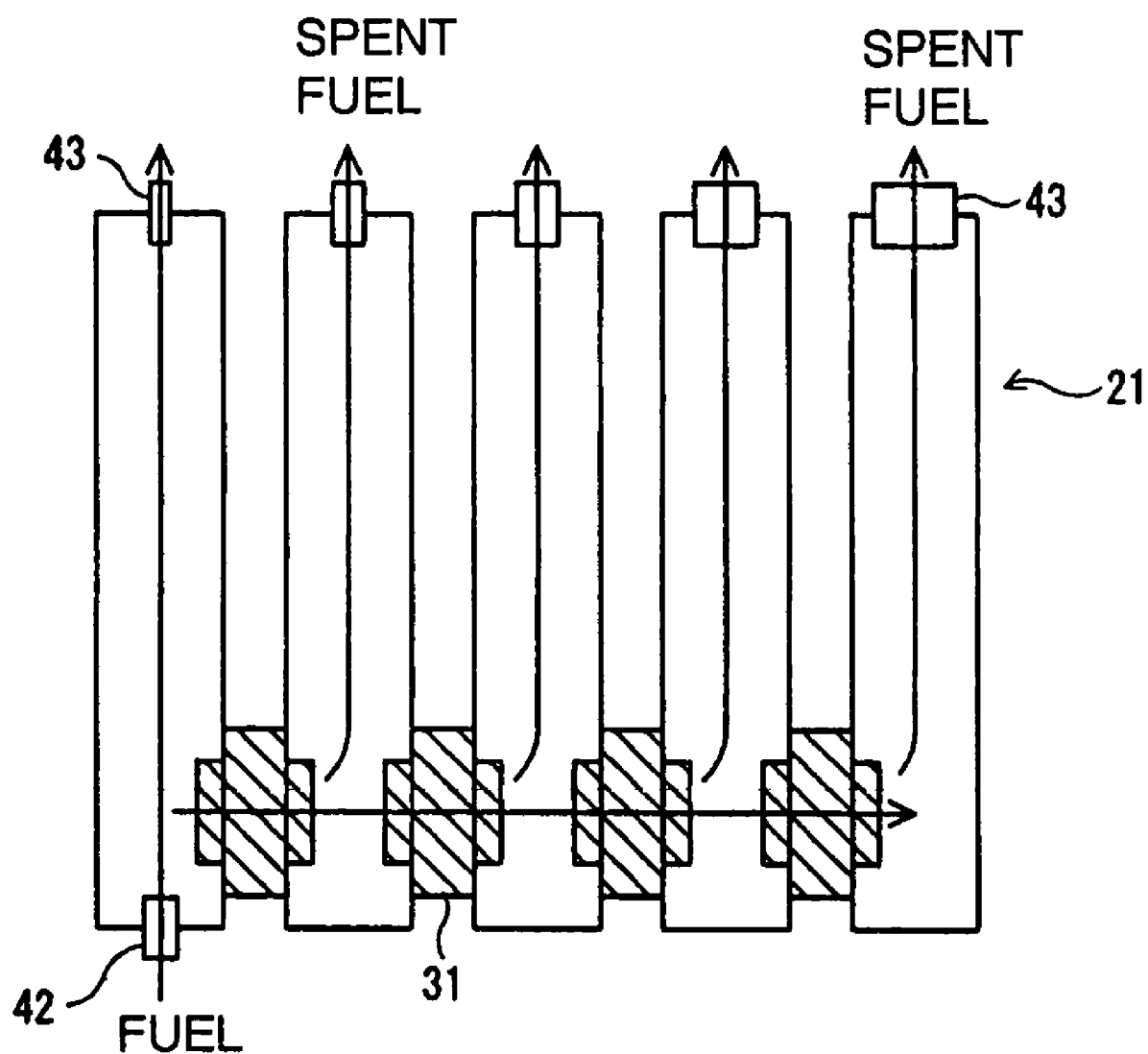
FIGS. 18 and 19 are views showing the Working Example 8 of a structure for coupling up the SOFC modules according to the invention, respectively.
Figure 19:
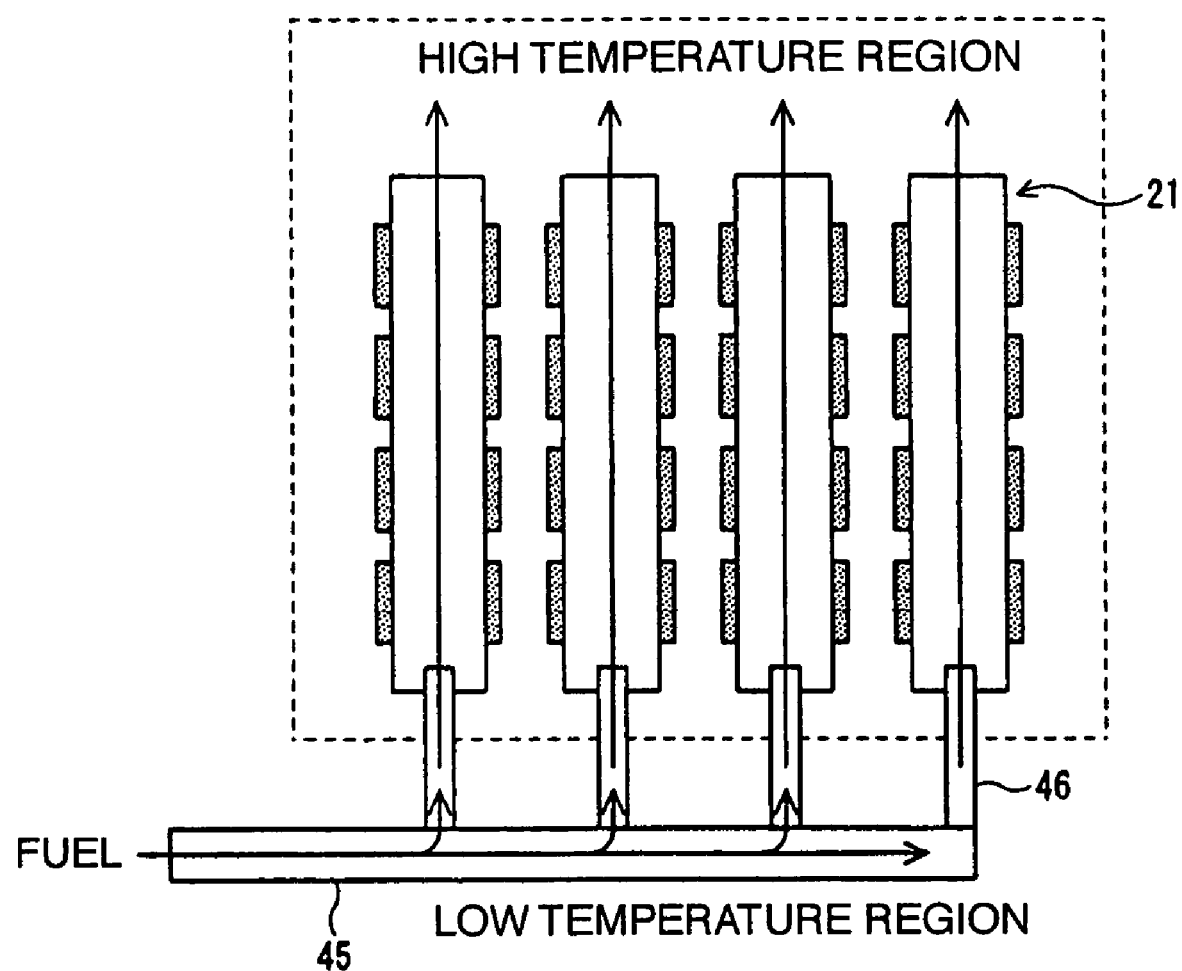

FIG. 18 is a view showing the present Working Example 8. As shown in FIG. 18, a fuel guide pipe 42 is provided only in the module at the forefront, and a spent fuel emission pipe 43 is provided in the respective modules. Further, the spent fuel emission pipes 43 of the respective modules are sequentially increased in inside diameter from the leftmost module toward the rightmost module. The fuel fed into the module at the forefront branches off into the next module through a hole of an interval-retaining hollow member 31, and thereafter, is sequentially fed to the respective modules in the similar manner. With Working Example 8, pressure loss occurs to the module with the spent fuel emission pipe 43 large in inside diameter when the cells are operated, whereupon a portion of the fuel fed into the module immediately preceding to the relevant module, corresponding to the pressure loss, is fed into the module subsequent to the relevant module through the interval-retaining hollow member 31. FIG. 18 shows the case where 5 units of the modules are coupled up and securely held together, however, the same applies to the case where 2 to 4 units, or 6 or more units of the modules are coupled up and securely held together FIG. 19 shows a type for feeding fuel in a room temperature region, structured such that fuel flow to the respective modules is adjusted by room temperature so as to be rendered equal. As shown in FIG. 19, fuel is caused to branch off from a common fuel feed pipe 45 to be fed into the respective modules via respective fuel guide pipes 46. For a coupling member (not shown) between the respective modules, use may be made of either the interval-retaining member 44 that is not hollow as shown in FIG. 17(c), or the interval-retaining hollow member 31 as shown in FIG. 11(c). In the case of using the interval-retaining hollow member 31, fuel is distributed mutually between the respective modules adjacent to each other through a hollow part, that is, the through-hole 34.

Construction for Configuration of Current Drawing Conductors

Figure 20:
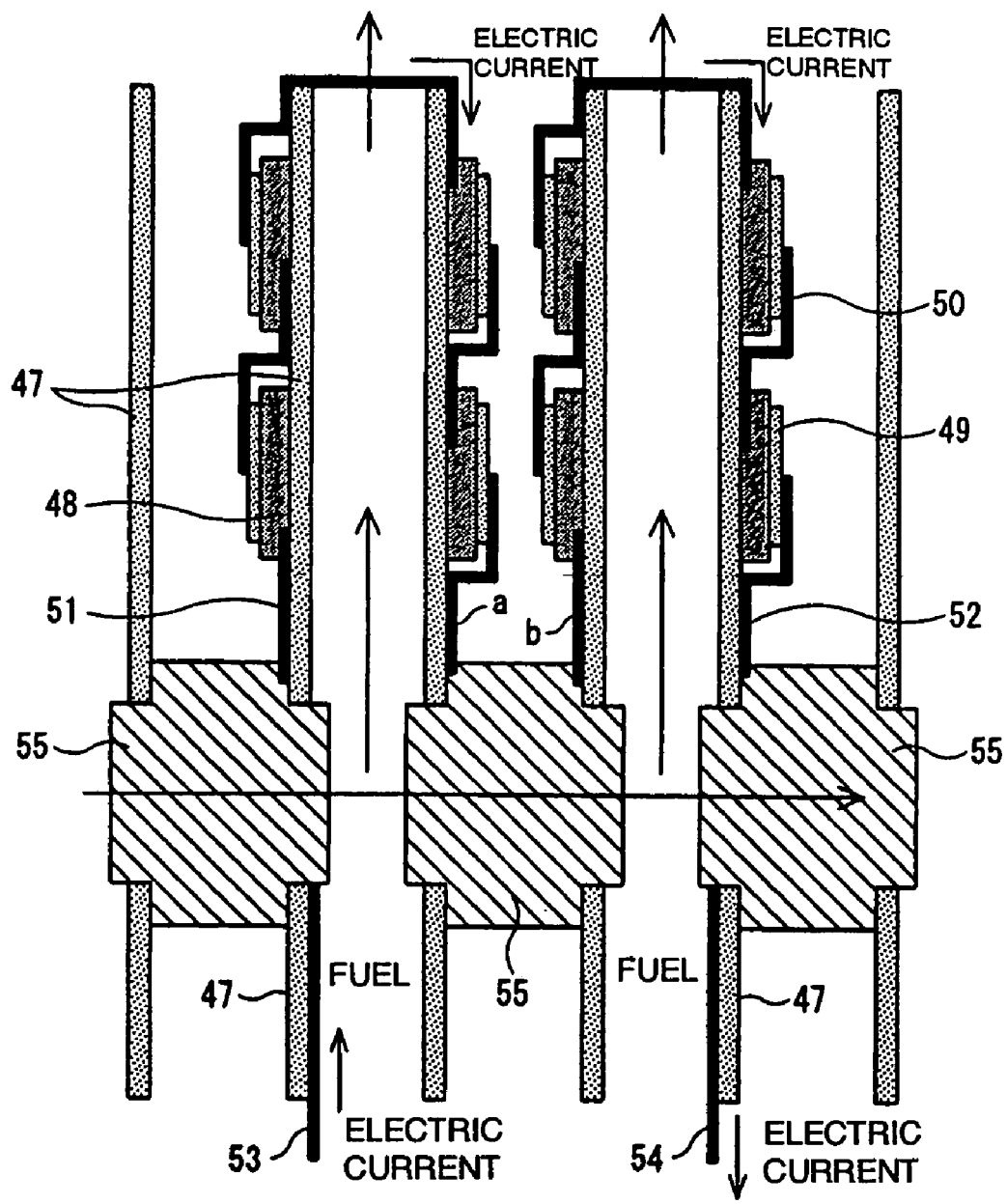
FIG. 20 is a view showing an example of a construction for configuration of conductors for drawing out current.

With the respective SOFC modules structured as described in the foregoing, and the respective SOFC bundled modules (that is, the SOFC modules made up by coupling up the plurality of the SOFC modules), electric power is drawn out via a conductor leading from the anode at the forefront in the direction of fuel flow, and via a conductor leading from the cathode at the rearmost in the direction of the fuel flow. With the present invention, both the conductors are disposed on the anode side of the respective SOFC modules, and all current is drawn out from a fuel flow path side thereof, thereby enabling degradation of both the conductors to be prevented. That is, since the SOFC fuel is a reducing gas such as hydrogen, carbon monoxide, or methane, the conductors are not oxidized. FIG. 20 is a view showing an example of a construction for configuration of the conductors for drawing out current. There is provided an electrolyte between an anode 48, and a cathode 49, however, description of the electrolyte is omitted in FIG. 20. In FIG. 20, reference numeral 50 denotes an interconnector. Further, in FIG. 20, there is shown the case of using the same interval-retaining hollow member 31 as is shown in FIG. 11(c) for an interval-retaining member 55, however, the same applies to the case of using other interval-retaining members such as one shown in FIG. 17(c).

As shown in FIG. 20, a current-drawing conductor 51 from the anode 48 is caused to lead to a conductor 53 provided on the inner side of an insulator substrate 47, and a current-drawing conductor 52 from the cathode 49 is caused to lead to a conductor 54 provided on the inner side of the insulator substrate 47. That is, both the conductors 53, 54 are caused to lead to the inside of the internal fuel flow part. In this case, since current drawn from the anode 48, and the cathode 49, respectively, is guided to the conductors 53, 54 disposed at the inner side of the insulator substrate 47, respectively, through the intermediary of the interval-retaining member 55, the interval-retaining member 55 also needs to be electroconductive. Accordingly, the interval-retaining member 55 itself is made of an electroconductive material, however, the interval-retaining member 55 can be rendered electroconductive by an appropriate method other than that, such as (1) a method of plating the surface of the interval-retaining member 55 with an electroconductive metal such as Ag, Pt, and so forth, (2) a method of causing the interval-retaining member 55 to contain the electroconductive metal such as Ag, Pt, and so forth, (3) a method of disposing conductors leading to the conductor 51 from the anode 48, and the conductor 52 from the cathode 49, respectively, inside the insulator substrate 47, thereby causing the conductors to be electrically continuous with the conductors 53, 54, respectively.

It is quite useful to render the interval-retaining member 55 electroconductive as described above because electrical connection between the adjacent modules can be implemented by so doing. Referring to FIG. 20, in the figure, the interconnector designated as "a", and the interconnector designated as "b" need to be electrically continuous, however, by rendering the interval-retaining member 55 electroconductive as described above, electrical connection between the interconnector "a", and the interconnector "b" can be implemented.

Construction for Configuration of Interconnector Between Adjacent Cells

With the respective SOFC modules structured as described in the foregoing, and the respective SOFC bundled modules, the interconnector is disposed between the adjacent cells. With the present invention, if a dense material, as the constituent material of the interconnector, is used between respective electrolytic films of the adjacent cells, a coarse material can be used between the cathode and the dense material. The interconnector is a conductor linking between the adjacent cells, that is, linking the cathode of the preceding cell, with the anode of the immediately following cell, and can be structured in the shape of a sheet, wire, or in other appropriate shapes.

Herein, in the description of the present invention, the term "dense" in the dense material described as above means having density corresponding to not less than 90%, preferably not less than 95% of the theoretical density of the material. In contrast, in the description of the present invention, the term "coarse" in the coarse material described as above means having density in a range of from 20% to less than 90% against the theoretical density of the material. With the present invention, for the constituent material of the interconnector, use is made of both the dense material, and the coarse material, however, it is essential to use at least the dense material between the respective electrolytic films of the adjacent cells, and on that premise, the dense material may be used in place of the coarse material at spots where the coarse material described hereinafter is to be used.

If the constituent material of the interconnector is, for example, $(La, Sr)CrO_3$, this material has poor sinterability, so that it is extremely difficult to implement fabrication of the interconnector out of the same. Accordingly, with the present invention, at least the dense material is used as material for the interconnector between the adjacent cells. As a result, gas-sealing performance is enhanced, thereby preventing gas from leaking between the interconnector and the electrolyte. In addition, with the use of the dense material, electrical contact can be secured. Further, as described above, the coarse material can be used between the cathode and the dense material. By so doing, it is possible to obtain an advantageous effect that the fabrication of the interconnector can be implemented concurrently with the formation of the cathode, or at a temperature lower than the sintering temperature of the cathode.

Configuration Construction 1 of Interconnectors

Figure 21:
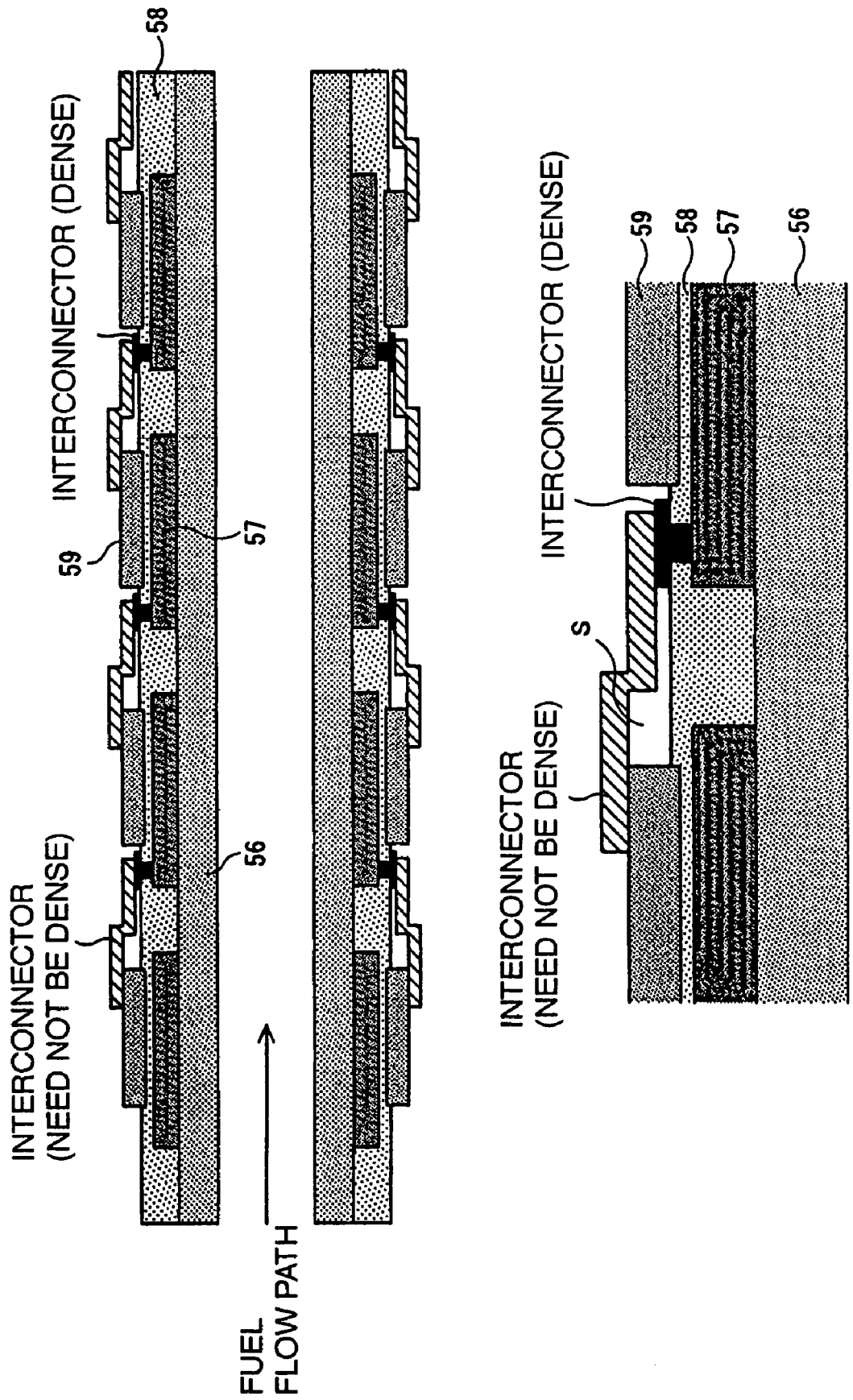
FIG. 21 is a view showing an interconnector configuration construction 1 according to the invention.

FIG. 21 is a view showing configuration construction 1 of interconnectors. A figure shown in the lower part of FIG. 21 is a partially enlarged view of a figure shown in the upper part of FIG. 21. In this respect, the same applies to FIGS. 22 to 31 referred to hereinafter. In FIG. 21, reference numeral 56 denotes a porous insulator substrate, 57 an anode, 58 an electrolyte, and 59 a cathode, and in this respect, the same applies to FIGS. 22 to 31 referred to hereinafter. Further, the underside face of the interconnector [in FIG. 21, a portion indicated as "interconnector (need not be dense)"] is normally in contact with the upper face of the electrolyte 58, however, there can be the case where spacing exists therebetween. FIG. 21 shows the case where the spacing, as indicated by S in the figure, exists therebetween, but the spacing may be filled up with an interconnector material, and so forth. In this respect, the same applies to FIGS. 22 to 26, and FIGS. 28 to 31, referred to hereinafter.

A dense portion of the interconnector is disposed between the adjacent cells (the cells disposed side by side in FIG. 21). With the present configuration construction 1, the dense material is used between the adjacent electrolytes 58, while the coarse material is used between the cathode 59 and the dense material. In the case of material composed mainly of an oxide expressed by, for example, chemical formula (Ln, A) CrO$_3$ (in the chemical formula, Ln refers to lanthanoids, and A refers to Ba, Ca, Mg, or Sr), this material has poor sinterability, so that it is extremely difficult to implement fabrication of the interconnector out of the same. Accordingly, as with the present configuration construction 1, by use of the dense material between the adjacent electrolytes 58, gas-sealing performance can be enhanced, and gas can be prevented from leaking between the interconnector and the electrolytes. In addition, with the use of the dense material, electrical contact can be secured.

In general, the interconnector is linked with the anode 57 by disposing the interconnector underneath the anode 57. In contrast, by causing the dense material for the interconnector to be present on the upper face of the anode 57, as shown in FIG. 21, the fabrication can be facilitated. Further, as there is adopted the construction wherein parts of the electrolyte 58 are covered by the interconnector, sealing performance can be enhanced. In respect of the use of the coarse material between the cathode 59 and the dense material, the same applies to configuration constructions that will be described hereinafter.

Configuration Construction 2 of Interconnectors

Figure 22:
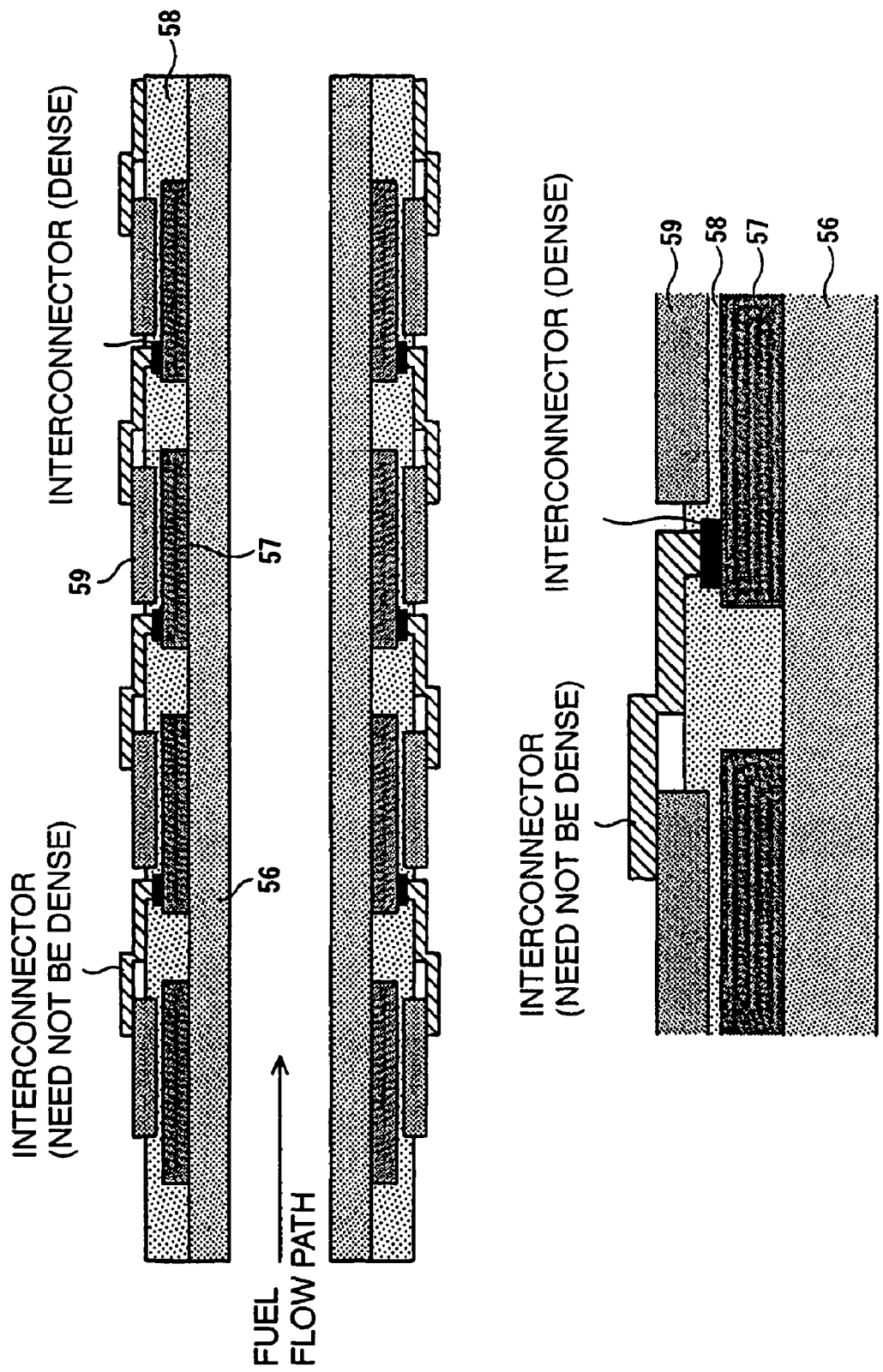
FIG. 22 is a view showing an interconnector configuration construction 2 according to the invention.

FIG. 22 is a view showing configuration construction 2 of interconnectors. A dense portion of an interconnector is disposed between the adjacent cells (the cells disposed side by side in FIG. 22). With the configuration construction 2, the dense material is disposed on a part of the top face of the anode 57 between the adjacent electrolytes 58, and a portion of the dense material is linked with the coarse material. By so doing, there is made up a construction wherein the top of the dense material except a coarse material portion of the interconnector is covered by the electrolytes 58. In other respects, the structure of the present configuration construction 2 is the same as that for the configuration construction 1. The present configuration construction 2 being of the construction wherein the top of the dense material is covered by the electrolytes 58, gas-sealing performance can be further enhanced.

Configuration Construction 3 of Interconnectors

Figure 23:
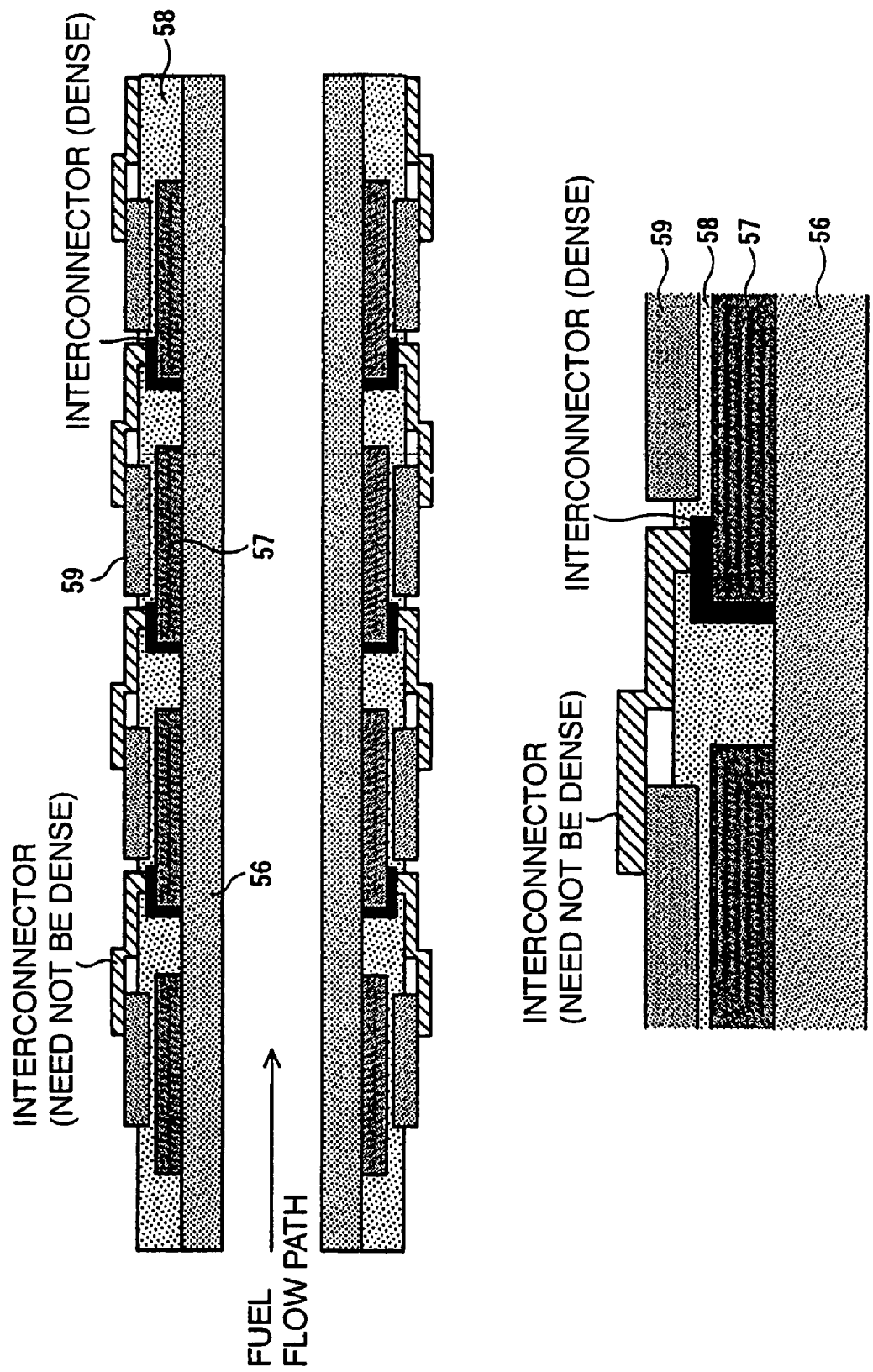
FIG. 23 is a view showing an interconnector configuration construction 3 according to the invention.

FIG. 23 is a view showing configuration construction 3 of interconnectors. An interconnector is disposed between the adjacent cells (the cells disposed side by side in FIG. 23). With the configuration construction 3, the dense material is disposed between the adjacent electrolytes 58, and on the top face of the anode 57, and a side face thereof, continuous to the top face. By so doing, a contact area between the dense material for the interconnector, and the electrolytes 58 can be increased, thereby enabling contact resistance between the interconnector and the anode 57 to be lowered. In other respects, the structure of the present configuration construction 3 is the same as that for the configuration construction 2.

Configuration Construction 4 of Interconnectors

Figure 24:
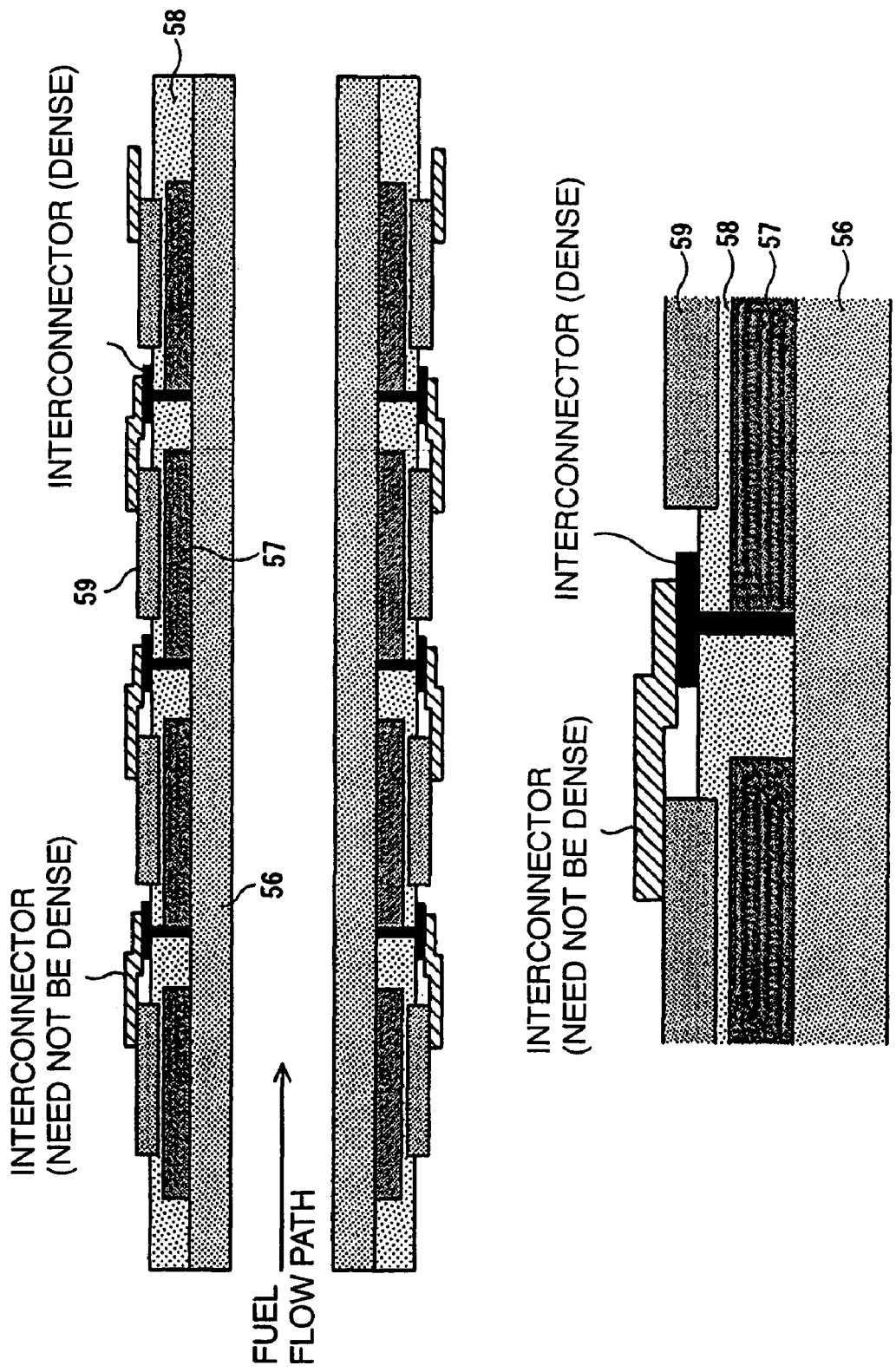
FIG. 24 is a view showing an interconnector configuration construction 4 according to the invention.

FIG. 24 is a view showing configuration construction 4 of interconnectors. A dense portion of an interconnector is disposed between the adjacent cells (the cells disposed side by side in FIG. 24). With the present configuration construction 4, the dense material for the interconnector is disposed between the adjacent electrolytes 58, and on a side face of the anode 57, continuous to the former. As shown in FIG. 24, the dense material is in a sectional shape resembling the letter T, and the underside face of the head thereof is in contact with the electrolytes 58 while most (that is, except a portion thereof, penetrated by the electrolyte 58) of one side face of the leg thereof is in contact with the anode 57, and the other side face of the leg thereof is in contact with the electrolyte 58. By so doing, a contact area between the dense material for the interconnector, and the electrolytes 58 can be increased, and contact resistance between the interconnector, and the anode 57 can be lowered, thereby enabling sealing performance to be enhanced. In other respects, the structure of the present configuration construction 4 is the same as that for the configuration construction 1.

Configuration Construction 5 of Interconnectors

Figure 25:
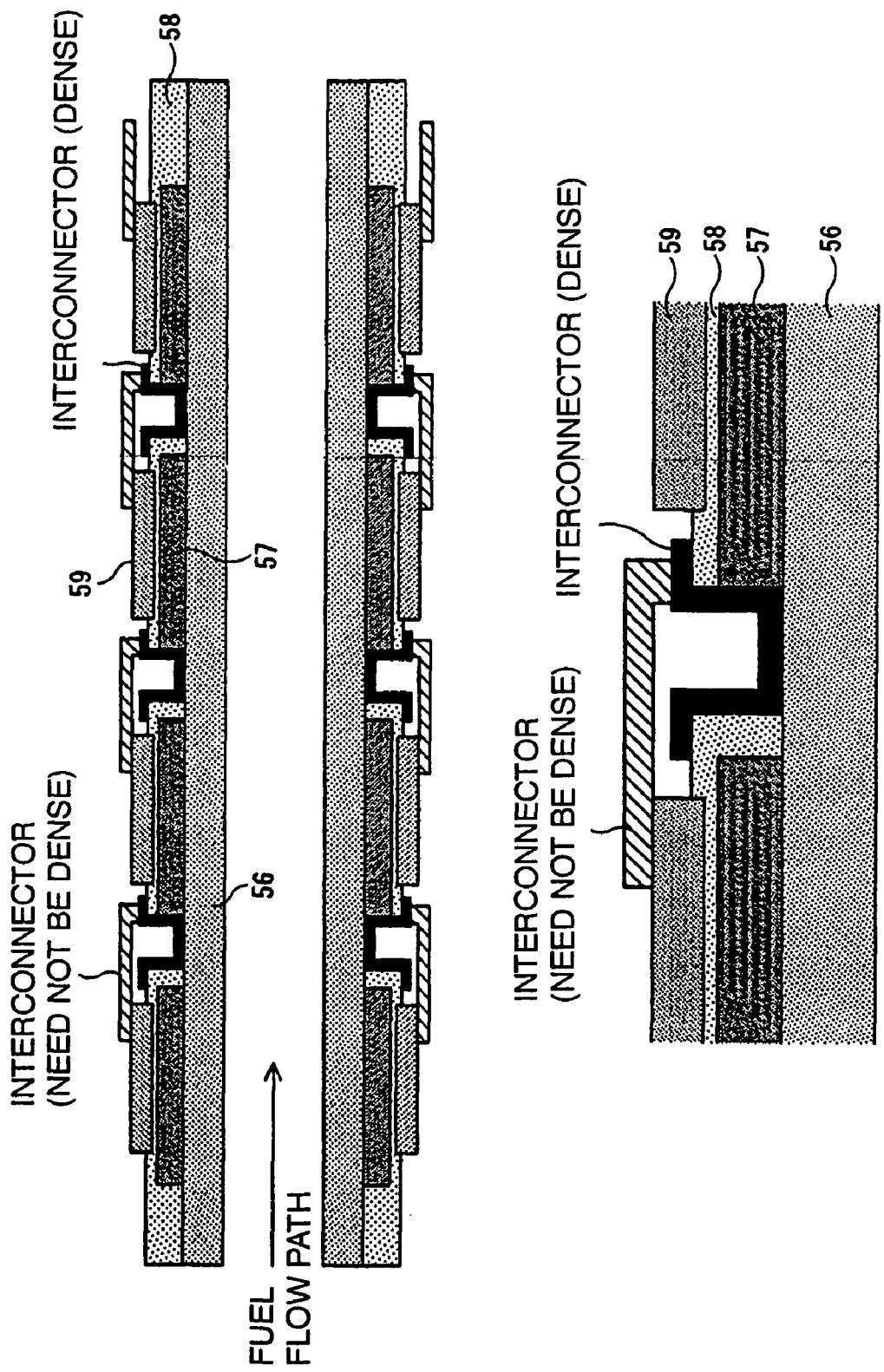
FIG. 25 is a view showing an interconnector configuration construction 5 according to the invention.

FIG. 25 is a view showing configuration construction 5 of interconnectors. A dense portion of an interconnector is disposed between the adjacent cells (the cells disposed side by side in FIG. 25). With the present configuration construction 5, the dense material for the interconnector is structured so as to continue from the top face of the electrolyte 58 of the preceding cell of the adjacent cells to a side face of the electrolyte 58, coming into contact with the top face of the porous insulator substrate 56, and to subsequently come into contact with a side face of the anode 57 of the immediately following cell before further continuing to the top face thereof. As a result, the electrolytes 58 can be completely separated from each other in comparison with the case of the interconnector configuration construction 4. That is, the respective electrolytes 58 of the adjacent cells are separated from each other. With the present configuration construction 5, gas leakage from the porous insulator substrate 56 can be sealed with the dense material for the interconnector.

Configuration Construction 6 of Interconnectors

Figure 26:
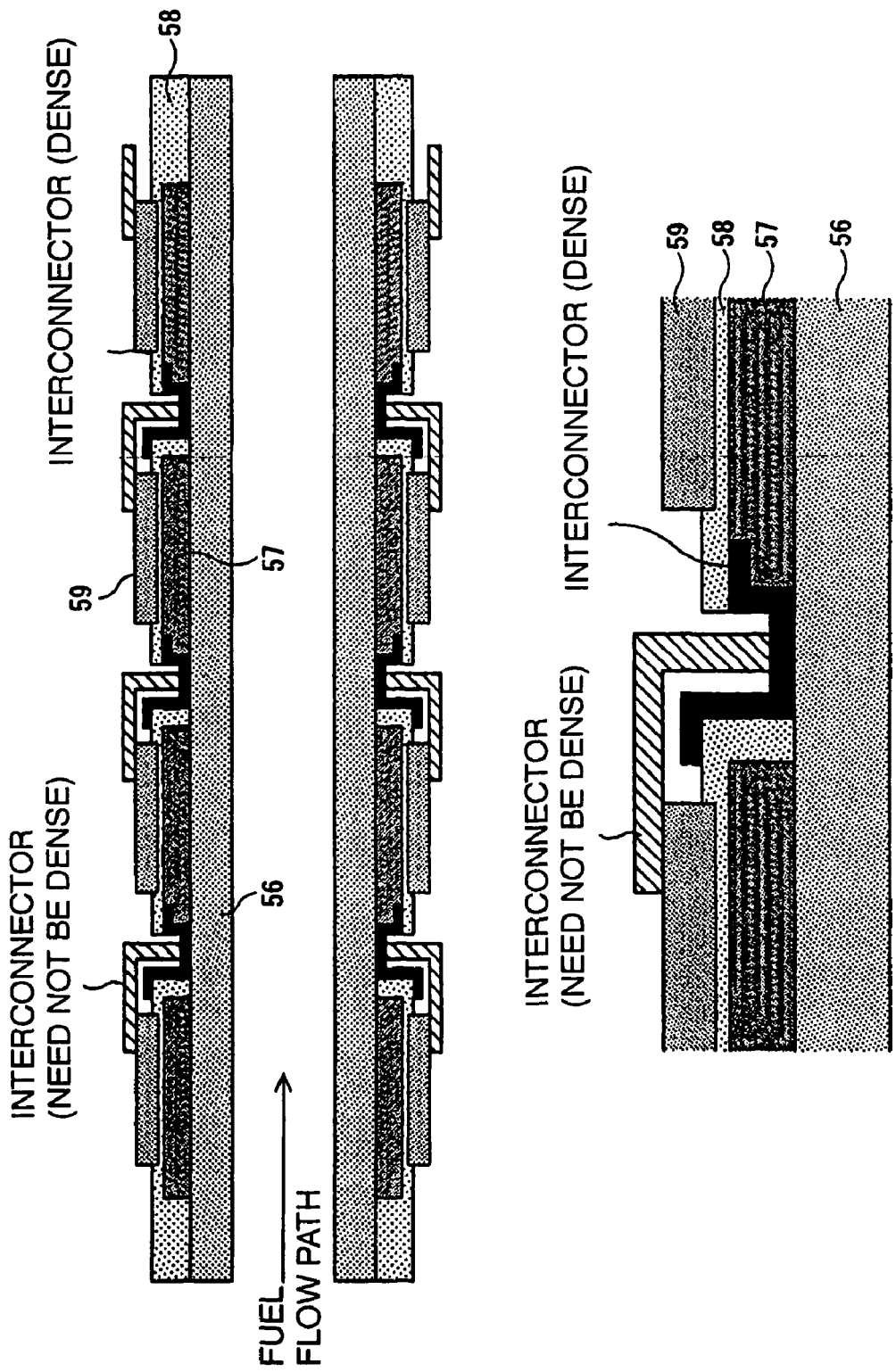
FIG. 26 is a view showing an interconnector configuration construction 6 according to the invention.

FIG. 26 is a view showing configuration construction 6 of interconnectors. An interconnector is disposed between the adjacent cells (the cells disposed side by side in FIG. 26). With the present configuration construction 6, the dense material for the interconnector is structured so as to continue from the top face of the electrolyte 58 of the preceding cell of the adjacent cells to a side face thereof, coming in contact with the top face of the porous insulator substrate 56, and to come into contact with a side face of the anode 57 of the immediately following cell before continuing to the underside face of the electrolyte 58. As a result, the respective electrolytes 58 of the adjacent cells are separated from each other as with the case of the configuration construction 5. In addition, the cathode 59 is disposed on the top face of the electrolyte 58. With the present configuration construction 6, sealing performance against gas leakage from the porous insulator substrate 56 can be enhanced with the dense material for the interconnector.

Configuration Construction 7 of Interconnectors

Figure 27:
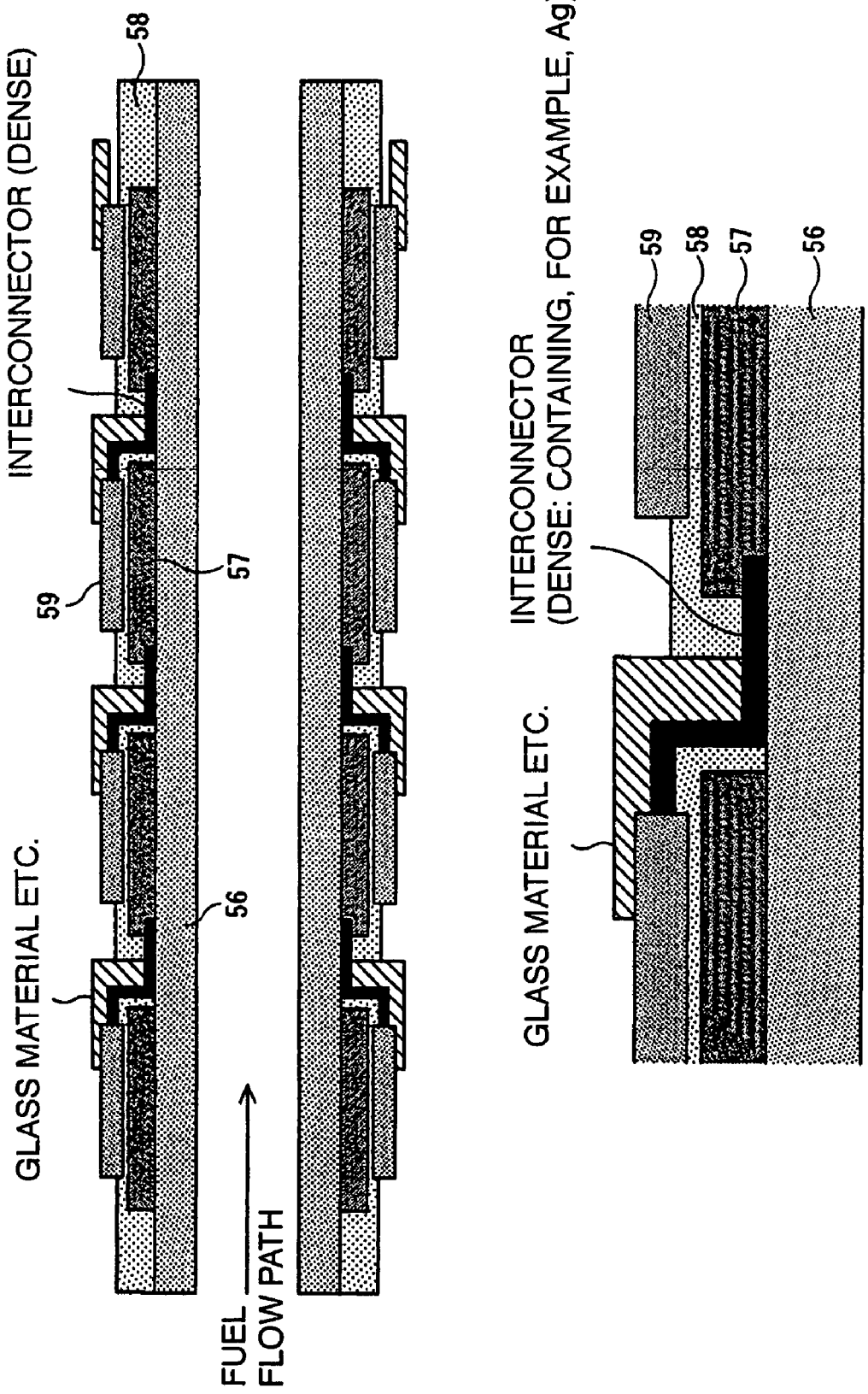
FIG. 27 is a view showing an interconnector configuration construction 7 according to the invention.

FIG. 27 is a view showing configuration construction 7 of interconnectors. An interconnector is disposed between the adjacent cells (the cells disposed side by side in FIG. 27). With the present configuration construction 7, the electrolytes 58 of the respective cells are disposed so as to cover the anode 57 including a side face thereof. With the present configuration construction 7, the dense material for the interconnector is structured so as to continue from the cathode 59 of the preceding cell of the adjacent cells to the top face of the electrolyte 58, coming in contact with a side face thereof, and to subsequently come into contact with the top face of the porous insulator substrate 56, further continuing to the underside face of the electrolyte 58 of the immediately following cell. As a result, the respective electrolytes 58 of the adjacent cells are separated from each other. With the present configuration construction 7, sealing performance against gas leakage from the porous insulator substrate 56 can be enhanced with the dense material for the interconnector. In the case where the dense material for the interconnector is composed of, for example, an Ag-containing material, there can be times when Ag is scattered if Ag is in single substance form. Accordingly, with the present configuration construction 7, the top of the Ag-containing material is covered with a glass material, and so forth, as shown in FIG. 27, thereby preventing scattering of Ag.

Configuration Construction 8 of Interconnectors

Figure 28:
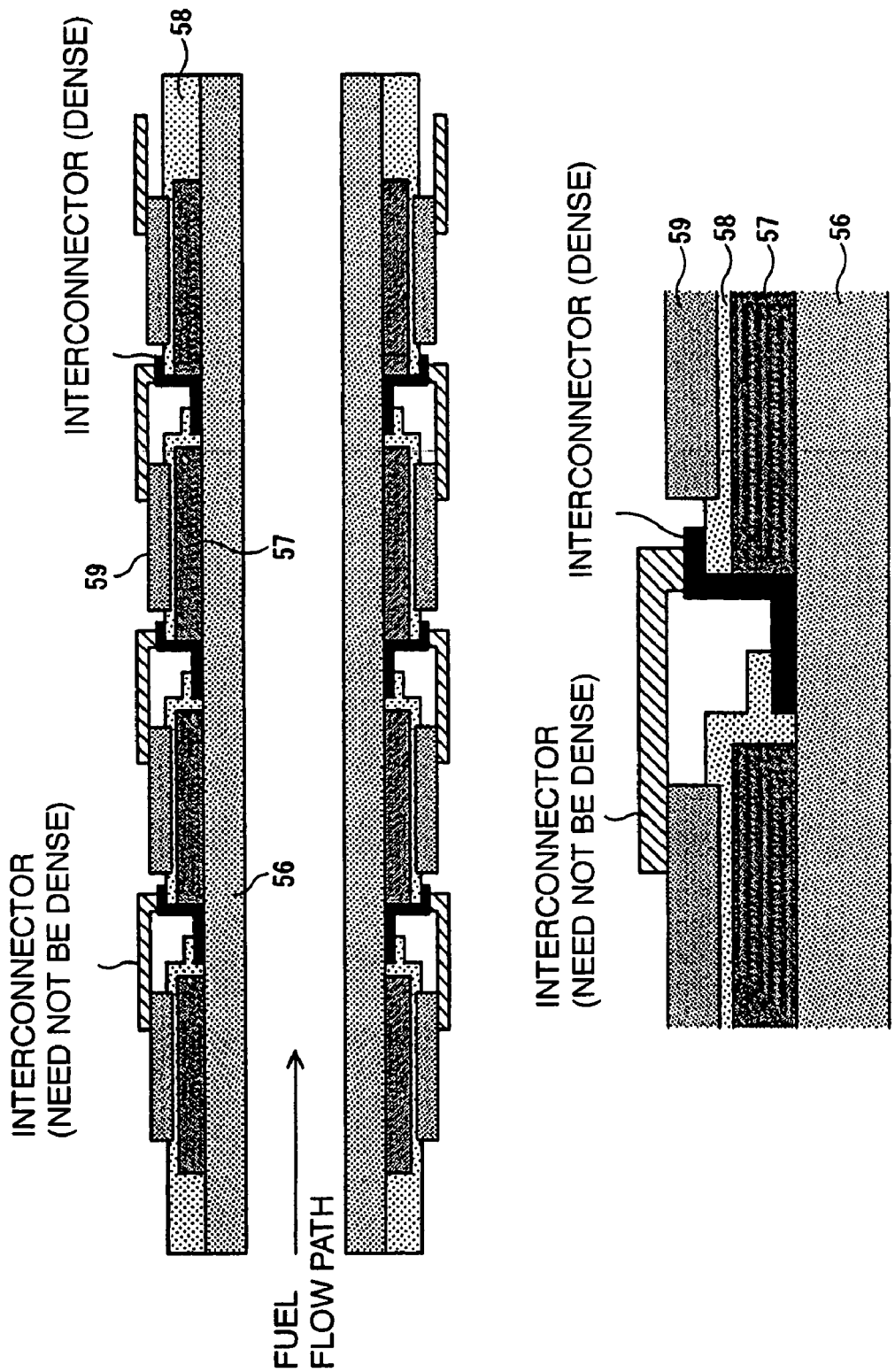
FIG. 28 is a view showing an interconnector configuration construction 8 according to the invention.

FIG. 28 is a view showing configuration construction 8 of interconnectors. An interconnector is disposed between the adjacent cells (the cells disposed side by side in FIG. 28). As shown in a sectional view of FIG. 28, the respective cells are structured such that a side face of both side faces of the anode 57, on the upstream side of fuel flow, is not covered with the electrolyte 58 while the other side face of the anode 57, on the downstream side of the fuel flow, is covered with the electrolyte 58, and the electrolyte 58 covers the top face of the insulator substrate 56. Further, a dense portion of the interconnector is structured so as to continue from the electrolyte 58 on the top face of the insulator substrate 56 (between the electrolyte 58 and the top face of the insulator substrate 56), coming in contact with the top face of the insulator substrate 56 to a side face of the anode 57 of the immediately following cell before coming into contact with the top face of the electrolyte 58. As a result, the respective electrolytes 58 of the adjacent cells are separated from each other. With the present configuration construction 8, the electrolytes 58 are completely separated from each other, that is, the respective electrolytes 58 of the adjacent cells are separated from each other, and by disposing the dense portion of the interconnector on the top face of the electrolyte 58, on the side of the cell, adjacent to the anode 57 with which the dense portion of the interconnector comes into contact, sealing performance can be enhanced. Further, since the electrolyte 58 covers between the side face of the anode 57, on the downstream side of the fuel flow, and the top face of the insulator substrate 56, sealing performance can be enhanced.

Configuration Construction 9 of Interconnectors

Figure 29:
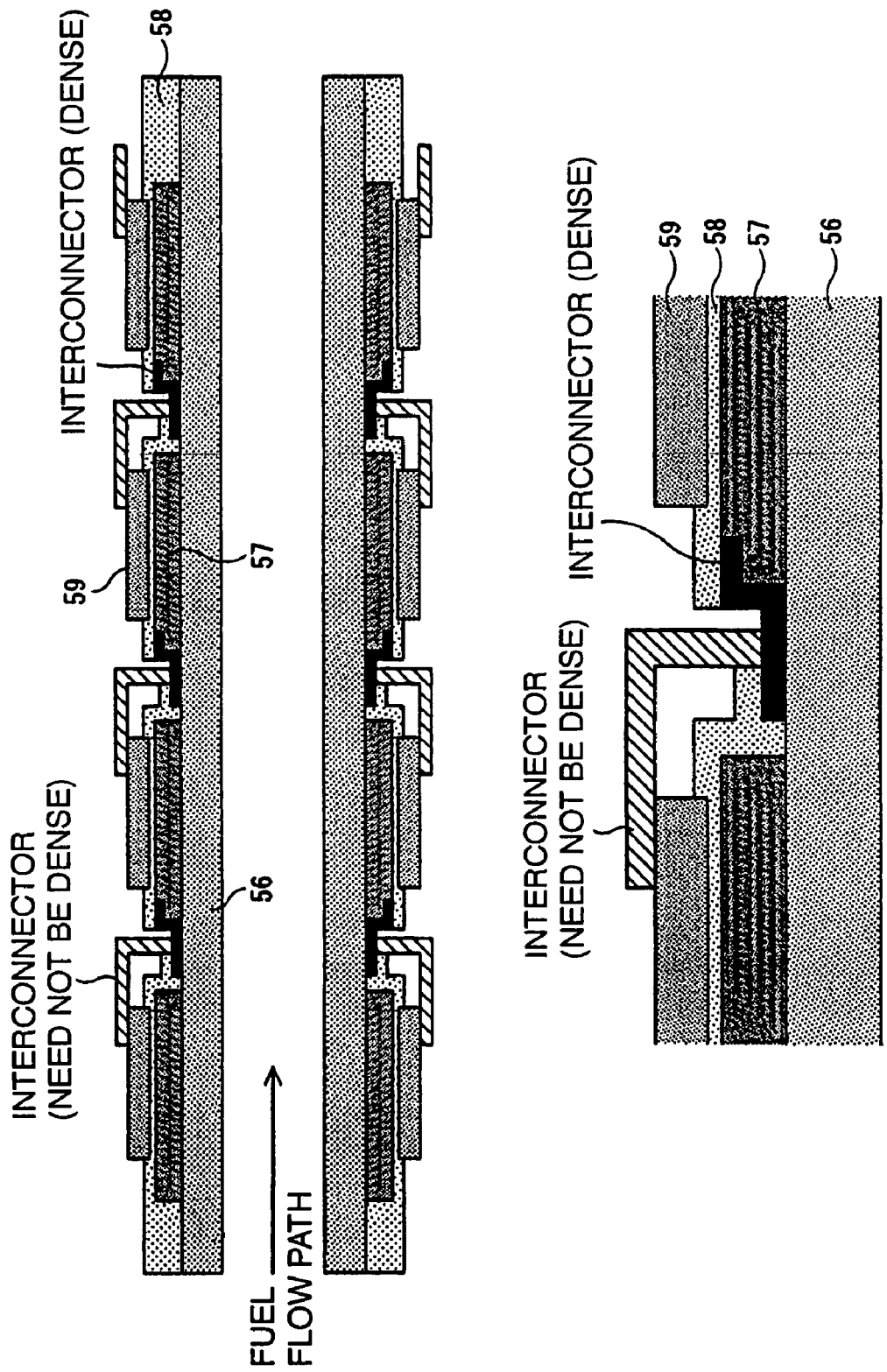
FIG. 29 is a view showing an interconnector configuration construction 9 according to the invention.

FIG. 29 is a view showing configuration construction 9 of interconnectors. An interconnector is disposed between the adjacent cells (the cells disposed side by side in FIG. 29). As shown in a sectional view of FIG. 29, the respective cells are structured such that a side face of both side faces of the anode 57, on the upstream side of fuel flow, is not covered with the electrolyte 58 while the other side face of the anode 57, on the downstream side of the fuel flow, is covered with the electrolyte 58, and the electrolyte 58 covers the top face of part of the insulator substrate 56. Further, a dense portion of the interconnector is structured so as to continue from the electrolyte 58 on the top face of the part of the insulator substrate 56, coming into contact with the top face of the insulator substrate 56, to a side face of the anode 57 of the immediately following cell before coming into contact with the underside face of the electrolyte 58 (that is, between the underside face of the electrolyte 58 and the anode 57). As a result, the respective electrolytes 58 of the adjacent cells are separated from each other. With the present configuration construction 9, the elec- trolytes 58 are completely separated between the respective cells, that is, the respective electrolytes 58 of the adjacent cells are completely separated from each other. Thus, by disposing the dense portion of the interconnector so as to continue from the electrolyte 58 on the top face of the part of the insulator substrate 56, coming into contact with the top face of the insulator substrate 56, to the side face of the anode 57 of the immediately following cell before coming into contact with the underside face of the electrolyte 58 (that is, between the underside face of the electrolyte 58 and the anode 57), as described above, sealing performance can be enhanced.

Configuration Construction 10 of Interconnectors

FIG. 30 is a view showing configuration construction 10 of interconnectors. A dense portion of an interconnector is disposed between the adjacent cells (the cells disposed side by side in FIG. 30). As shown in a sectional view of FIG. 30, with the interconnector configuration construction 10, the respective cells are structured such that a side face of both side faces of the anode 57, on the upstream side of fuel flow, is not covered with the electrolyte 58 while the other side face of the anode 57, on the downstream side of the fuel flow, is covered with the electrolyte 58, and the electrolyte 58 covers the top face of part of the insulator substrate 56. Further, the dense portion of the interconnector is structured so as to continue from the top face of the electrolyte 58 on the top face of the part of the insulator substrate 56, coming into contact with the top face of the insulator substrate 56, to a side face of the anode 57 of the immediately following cell before coming into contact with the underside face of the electrolyte 58 (that is, between the underside face of the electrolyte 58 and the anode 57). With the interconnector configuration construction 10, the electrolytes 58 are completely separated between the respective cells, that is, the respective electrolytes 58 of the adjacent cells are completely separated from each other. Thus, by disposing the dense portion of the interconnector so as to continue from the top face of the electrolyte 58 on the top face of the part of the insulator substrate 56, coming into contact with the top face of the insulator substrate 56, to the side face of the anode 57 of the immediately following cell before coming into contact with the underside face of the electrolyte 58 (that is, between the underside face of the electrolyte 58 and the anode 57), as described above, sealing performance can be enhanced.

Configuration Construction 11 of Interconnectors

Figure 31:
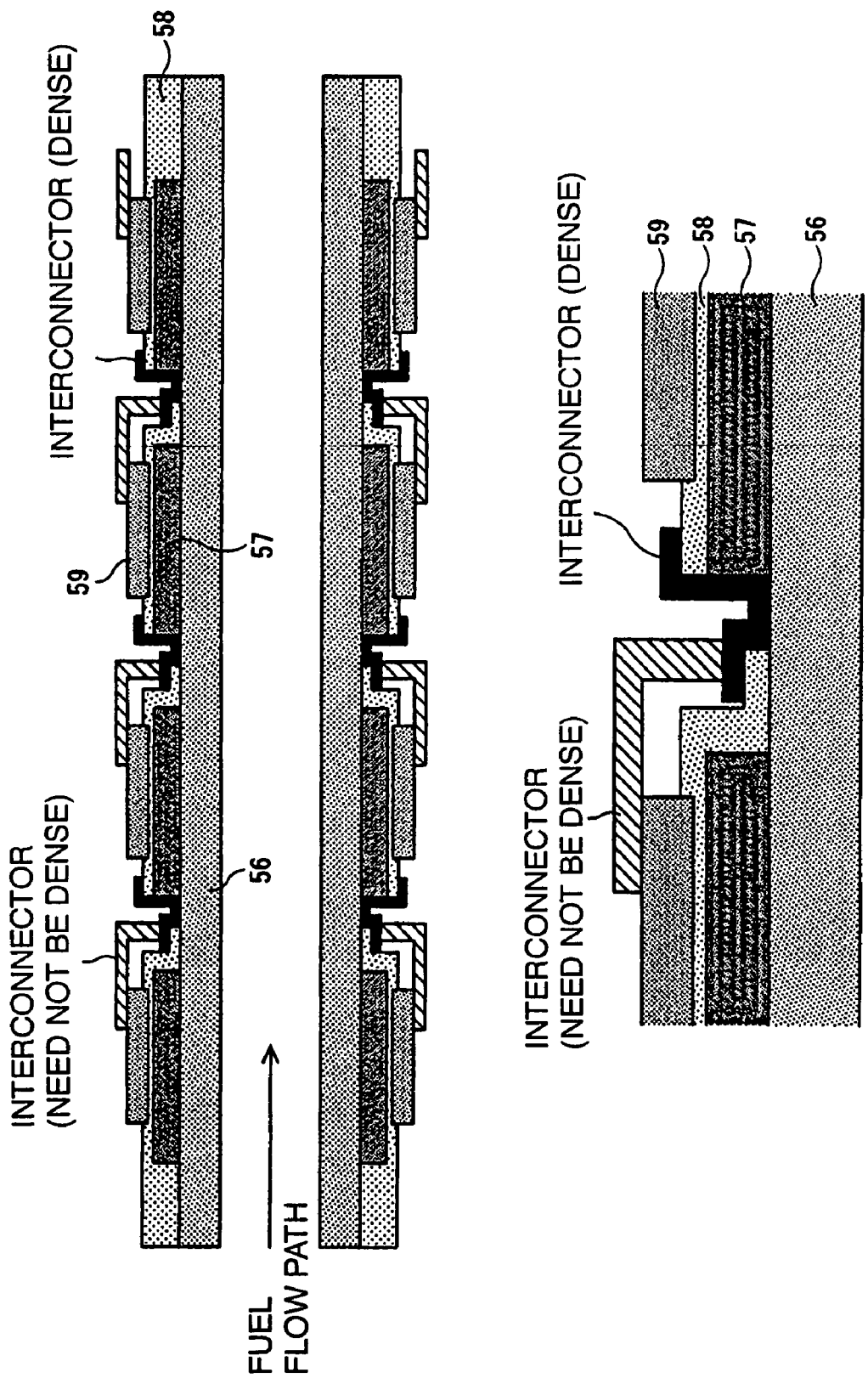
FIG. 31 is a view showing an interconnector configuration construction 11 according to the invention.

FIG. 31 is a view showing interconnector configuration construction 11 of interconnectors. As shown in a sectional view of FIG. 31, with the present interconnector configuration construction 11, the respective cells are structured such that a side face of both side faces of the anode 57, on the upstream side of fuel flow, is not covered with the electrolyte 58 while the other side face of the anode 57, on the downstream side of the fuel flow, is covered with the electrolyte 58, and the electrolyte 58 covers the top face of part of the insulator substrate 56. Further, the dense portion of the interconnector is structured so as to continue from the top face of the electrolyte 58 on the top face of the part of the insulator substrate 56, coming into contact with the top face of the insulator substrate 56, to a side face of the anode 57 of the immediately following cell before coming into contact with the top face of the electrolyte 58. With the present configuration construction 11, the electrolytes 58 are completely separated between the respective cells, that is, the respective electrolytes 58 of the adjacent cells are completely separated from each other. Thus, by disposing the dense portion of the interconnector so as to continue from the top face of the electrolyte 58 on the top face of the part of the insulator substrate 56, coming into contact with the top face of the insulator substrate 56, to the side face of the anode 57 of the immediately following cell before coming into contact with the top face of the electrolyte 58, as described above, sealing performance can be enhanced.

The invention claimed is:

1. A solid oxide fuel cell module, comprising:
    a plurality of cells, each cell comprising a fuel electrode, an air electrode and an electrolyte provided between the fuel electrode and the air electrode;
    an interconnector for electrically connecting the air electrode and the fuel electrode of adjacent cells in series;
    a substrate having an internal fuel flow path for a fuel to flow through and an insulating face in contact with the plurality of cells;
    a cell group is formed of a plurality of cells having an identical area and a plurality of the cell groups are formed on the substrate;
    individual cells not belonging to any cell group are also formed on the substrate;
    wherein the cell groups and the individual cells are disposed such that the areas of the individual cells and the respective cells of the cell groups sequentially increase along a direction of the fuel flow, and a constituent material of each interconnector comprises silver and each interconnector is covered with glass, a constituent material of each interconnector comprises an oxide expressed by chemical formula (Ln, A) $CrO_3$, where Ln refers to lanthanoids and A refers to Ba, Ca, Mg or Sr or a constituent material of each interconnector comprises an oxide material containing Ti.

2. A solid oxide fuel cell module according to claim 1, wherein the substrate is polygonal, elliptical, or tubular in cross-sectional shape.

3. A solid oxide fuel cell module according to claim 1, wherein the substrate has Ni diffused therein.

4. A solid oxide fuel cell module according to claim 3, wherein an amount of the Ni diffused corresponds to not more than 35 vol. %.

5. A solid oxide fuel cell module according to claim 1, wherein the constituent material of the substrate is a mixture of MgO and $MgAl_2O_4$, a zirconia-based oxide, or a mixture of the zirconia-based oxide, MgO and $MgAl_2O_4$.

6. A solid oxide fuel cell module according to claim 5, wherein the mixture of MgO and $MgAl_2O_4$ is a mixture of MgO and $MgAl_2O_4$, containing 20 to 70 vol. % of MgO.

7. A solid oxide fuel cell module according to claim 1, wherein the constituent material of each interconnector comprises an oxide expressed by chemical formula (Ln, A) $CrO_3$, where Ln refers to lanthanoids and A refers to Ba, Ca, Mg, or Sr.

8. A solid oxide fuel cell module according to claim 1, wherein the constituent material of each interconnector comprises an oxide material containing Ti.

9. A solid oxide fuel cell module according to claim 8, wherein the oxide material containing Ti is $MTiO_3$, where M refers to at least one element selected from the group consisting of Ba, Ca, Pb, Bi, Cu, Sr, La, Li and Ce.

10. A solid oxide fuel cell module according to claim 1, wherein the constituent material of the interconnector comprises $(La_{1-x}Sr_x)$ $CrO_3$, where x=0 to 0.6, deposited on a silver-containing metal.

11. A solid oxide fuel cell module according to claim 1, wherein the constituent material of the interconnector comprises $(La_{1-x}Sr_x)$ $CrO_3$, where x=0 to 0.6, deposited on a material composed mainly of Ag.

12. A solid oxide fuel cell module according to claim 1, further comprising an interface layer between the electrolyte and the cathode.

13. The solid oxide fuel cell module of claim 1, wherein the plurality of cells are formed in a plurality of rows from first to n-th rows on a surface of the substrate.

14. The solid oxide fuel cell module of claim 1, wherein the constituent material of each interconnector comprises silver and each interconnector is covered with glass.

15. A solid oxide fuel cell module according to claim 14, wherein the material comprising Ag is composed of at least one substance selected from the group consisting of Ag, Ag solder and a mixture of Ag and glass.

* * * * *